(12) United States Patent
Zinevich

(10) Patent No.: US 12,028,123 B2
(45) Date of Patent: Jul. 2, 2024

(54) MONITORING LEAKAGE IN AERONAUTICAL BAND OF HIGH SPLIT HFC

(71) Applicant: Victor Zinevich, Voronezh (RU)

(72) Inventor: Victor Zinevich, Voronezh (RU)

(73) Assignee: Arcom Digital Patent LLC, Syracuse, NY (US)

( * ) Notice: Subject to any disclaimer, the term of this patent is extended or adjusted under 35 U.S.C. 154(b) by 0 days.

(21) Appl. No.: 18/234,190

(22) Filed: Aug. 15, 2023

(65) Prior Publication Data

US 2023/0388032 A1 Nov. 30, 2023

Related U.S. Application Data

(60) Division of application No. 17/654,284, filed on Mar. 10, 2022, now Pat. No. 11,736,214, which is a continuation-in-part of application No. 17/088,775, filed on Nov. 4, 2020, now Pat. No. 11,356,178.

(60) Provisional application No. 63/006,355, filed on Apr. 7, 2020, provisional application No. 62/969,238, filed on Feb. 3, 2020, provisional application No. 62/930,030, filed on Nov. 4, 2019.

(51) Int. Cl.
  *H04B 17/354* (2015.01)
  *H04B 10/2575* (2013.01)
  *H04B 17/10* (2015.01)

(52) U.S. Cl.
  CPC ......... *H04B 17/354* (2015.01); *H04B 17/102* (2015.01); *H04B 17/104* (2015.01); *H04B 10/2575* (2013.01)

(58) Field of Classification Search
  None
  See application file for complete search history.

(56) References Cited

U.S. PATENT DOCUMENTS

| | | | |
|---|---|---|---|
| 6,600,515 B2 | 7/2003 | Bowyer et al. | |
| 8,856,850 B2 | 10/2014 | Sala et al. | |
| 8,904,460 B2 * | 12/2014 | Zinevich | G01S 5/06 725/111 |

(Continued)

OTHER PUBLICATIONS

PCT International Search Report and Written Opinion of the International Searching Authority for PCT/US 20/58785 dated Feb. 4, 2021 (11 pages).

(Continued)

*Primary Examiner* — Jai M Lee
(74) *Attorney, Agent, or Firm* — Harris Beach PLLC

(57) ABSTRACT

A method for monitoring leakage in an aeronautical band of a high split HFC by a detection and validation of OUDP bursts includes: providing an apparatus for use in a patrol vehicle, the apparatus including a leak signal receiver coupled to a processor; measuring a duration of detected bursts to provide a plurality of burst durations; collecting a histogram of the burst durations during a measuring session to provide a duration histogram; and determining a presence of a leak based on a comparison of the duration histogram with expected durations of OUDP bursts. Systems for monitoring leakage in an aeronautical band of a high split HFC by a detection and validation OUDP bursts, and other methods for monitoring leakage in an aeronautical band of a high split HFC by a detection and validation OUDP bursts are also described.

6 Claims, 27 Drawing Sheets

(56) References Cited

U.S. PATENT DOCUMENTS

| | | | |
|---|---|---|---|
| 9,565,580 B2* | 2/2017 | Zinevich | H04L 43/0823 |
| 9,832,089 B2* | 11/2017 | Zinevich | H04L 27/2601 |
| 9,882,663 B2 | 1/2018 | Zinevich | |
| 9,882,668 B2 | 1/2018 | Zinevich | |
| 11,271,650 B1* | 3/2022 | Bonen | H04B 10/2575 |
| 2004/0199789 A1 | 10/2004 | Shaw et al. | |
| 2006/0101496 A1 | 5/2006 | Syed | |
| 2013/0004179 A1 | 1/2013 | Nielsen et al. | |
| 2013/0291044 A1 | 10/2013 | Zinevich | |
| 2014/0105251 A1 | 4/2014 | Bouchard | |
| 2015/0181442 A1 | 6/2015 | Zinevich | |
| 2015/0341810 A1* | 11/2015 | Murphy | G01R 31/58 |
| | | | 375/224 |
| 2016/0036492 A1* | 2/2016 | Williams | G01S 5/02695 |
| | | | 375/228 |
| 2017/0251207 A1* | 8/2017 | Bush | H04N 21/6168 |
| 2017/0272184 A1* | 9/2017 | Zinevich | G01S 5/0246 |
| 2018/0076910 A1 | 3/2018 | Zhang et al. | |
| 2021/0135755 A1 | 5/2021 | Zinevich | |
| 2021/0226664 A1 | 7/2021 | Couch et al. | |
| 2021/0285841 A1 | 9/2021 | Bouchard | |
| 2022/0200715 A1* | 6/2022 | Zinevich | H04B 17/354 |

OTHER PUBLICATIONS

Chrostowski, John, et al., "Detecting and Measuring Upstream Leakage Levels in a One Gpbs Symmetrical High Split Hybrid Fiber Coax Network," 2020, Fall Technical Forum (38 pgs).

EPO Extended Search Report for corresponding European Application No. 20883836.7 dated Nov. 27, 2023 (11 pages).

* cited by examiner

MONITORING LEAKAGE IN AERONAUTICAL BAND OF HIGH SPLIT HFC

CROSS-REFERENCE TO RELATED APPLICATIONS

This application is a divisional of U.S. patent application Ser. No. 17/654,284, MONITORING LEAKAGE IN AERONAUTICAL BAND OF HIGH SPLIT HFC, filed Mar. 10, 2022, now allowed, and claims priority to and the benefit of U.S. Pat. No. 11,356,178, MONITORING LEAKAGE IN AERONAUTICAL BAND OF HIGH SPLIT HFC, issued Jun. 7, 2022, U.S. provisional patent application Ser. No. 62/930,030, LEAKAGE DETECTION WITHIN THE UPSTREAM BANDWIDTH OF AN HFC NETWORK, filed Nov. 4, 2019, U.S. provisional patent application Ser. No. 62/969,238, METHOD OF MONITORING LEAKAGE AT AERONAUTICAL BAND OF HIGH-SPLIT HFC NETWORK, filed Feb. 3, 2020, U.S. provisional patent application Ser. No. 63/006,355, MONITORING LEAKAGE IN AERONAUTICAL BAND OF HIGH SPLIT HFC, filed Apr. 7, 2020, all of which applications are incorporated herein by reference in their entirety.

FIELD OF THE APPLICATION

The application relates to signal leakage detection in a Hybrid Fiber-Coaxial (HFC) network, particularly to upstream leak detection.

BACKGROUND

The task of detecting leakage from the coaxial part of an HFC network is very important, such as, for preventing interference at the aeronautical and LTE bands and for isolation of ingress in the return path of the HFC network. In legacy DOCSIS 3.0 HFC networks, the aeronautical band (108-137 MHz) is overlapped with the downstream bandwidth. For leakage detection, downstream signals such as analog video carriers or pilots are injected into a guard bandwidth between downstream QAM channels, or there can be cross correlation detection of the QAM downstream channel (See for example, QAM Snare product, <https://www.arcomdigital.com/qam-snare/> available from Arcom of Syracuse, NY), or for DOCSIS 3.1 networks, detection of pilot harmonics of the OFDM signal (See for example, U.S. Pat. No. 9,832,089, also assigned to Arcom Digital LLC, and incorporated herein by reference in its entirety for all purposes) has also been used.

SUMMARY

A method for monitoring leakage in an aeronautical band of a high split HFC by a detection and validation of OUDP bursts includes: providing an apparatus for use in a patrol vehicle, the apparatus including a leak signal receiver coupled to a processor; measuring a duration of detected bursts to provide a plurality of burst durations; collecting a histogram of the burst durations during a measuring session to provide a duration histogram; and determining a presence of a leak based on a comparison of the duration histogram with expected durations of OUDP bursts.

After the step of providing and before the step of determining, the method can further include the steps of: sending GPS coordinates of a location of the patrol vehicle to a leakage data server; and receiving a plurality of expected durations of OUDP bursts for a current location of the patrol vehicle.

If the comparison of the duration histogram with the expected durations of OUDP bursts exceeds a threshold, the method can include sending a report to the leakage data server including a time stamp, a GPS coordinate, and a leak level.

A display can be operatively coupled to the processor and after the step of comparing, a step of determining the presence of the leak can include showing an indication of a detected leak on a map in a vicinity of the current location of the patrol vehicle.

An upstream leak detection system for monitoring leakage in an aeronautical band of a high split HFC by a detection and validation OUDP bursts includes a leak detection apparatus configured for use in a mobile patrol vehicle. The leak detection apparatus includes: a processor, a leakage receiver including a burst leak signal detector to measure a duration of detected bursts, the leakage receiver operatively coupled to the processor. A leakage data server includes a database with cable modems (CMs) physical and IP addresses and a core to stimulate an upstream traffic from a plurality of CM in a current vicinity of the mobile patrol vehicle.

A method for monitoring leakage in an aeronautical band of a high split HFC by a detection and validation OUDP bursts includes: providing an apparatus for use in a patrol vehicle, the apparatus including a leak signal receiver coupled to a processor; auto-correlating cyclic prefixes of OFDMA symbols within OUDP bursts by one or more autocorrelation functions to provide a plurality of coherent responses; and determining a presence of a leak based on an accumulation of the plurality of coherent responses.

After the step of providing and before the step of determining, the method can further include the steps of: sending GPS coordinates of a location of the patrol vehicle to a leakage data server; and receiving a plurality of expected coherent responses for a current location of the patrol vehicle.

If the step of determining the presence of a leak based on the accumulation of the plurality of coherent responses exceeds a threshold, the method can include sending a report to the leakage data server including a time stamp, a GPS coordinate, and a leak level.

A display can be operatively coupled to the processor and the step of determining the presence of the leak, can include showing an indication of a detected leak on a map in a vicinity of the current location of the patrol vehicle.

An upstream leak detection system for monitoring leakage in an aeronautical band of a high split HFC by a detection and validation OUDP bursts includes a leak detection apparatus configured for use in a mobile patrol vehicle. The leak detection apparatus includes a processor, a leakage receiver including a burst leak signal detector including a process to auto-correlate cyclic prefixes of OFDMA symbols within OUDP bursts by one or more autocorrelation functions to provide a plurality of coherent responses, the leakage receiver operatively coupled to the processor. A leakage data server includes a database with cable modems (CMs) physical and IP addresses and a core to stimulate an upstream traffic from a plurality of CM in a current vicinity of the mobile patrol vehicle.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Definitions

Figure 1:
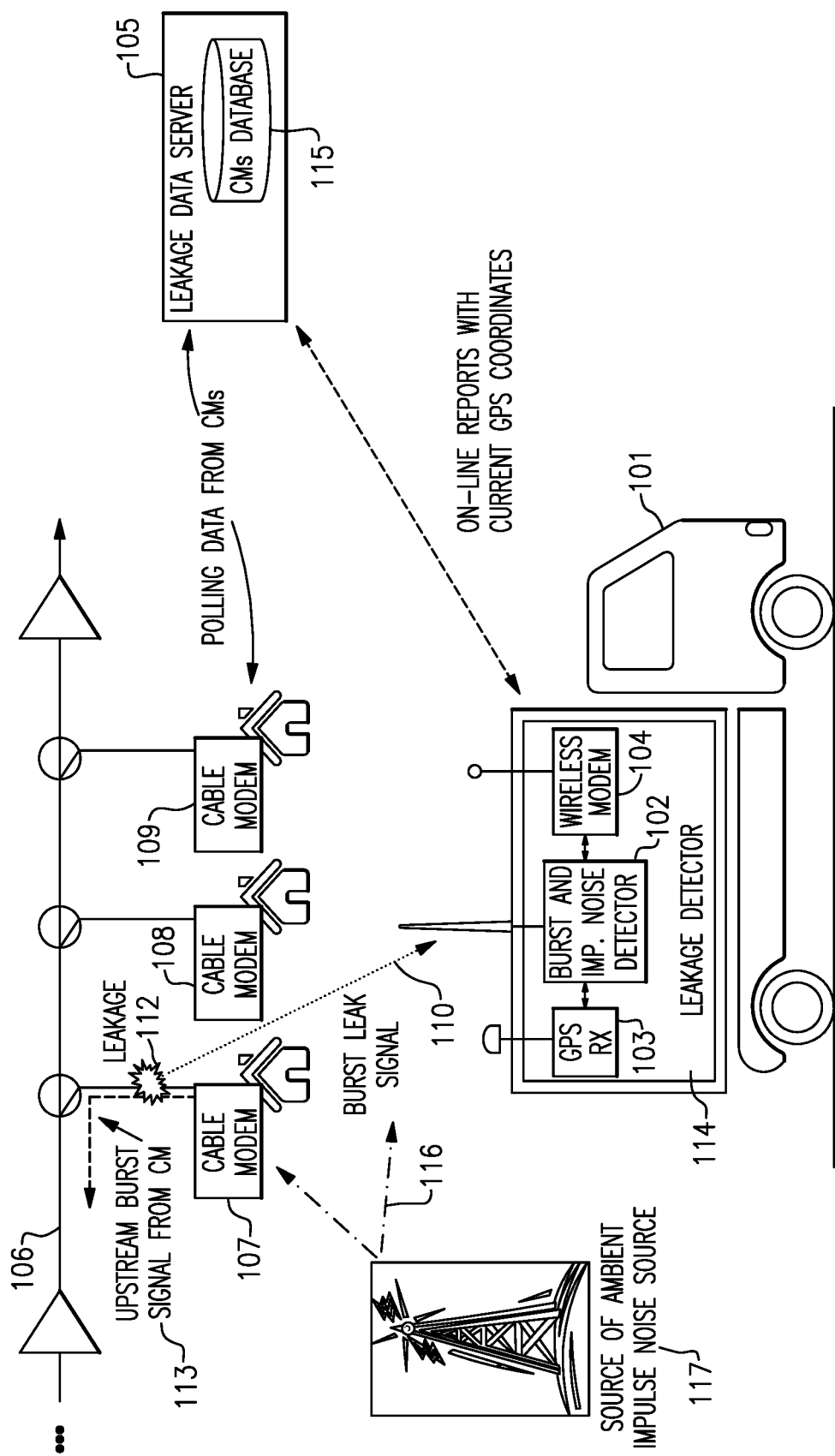
FIG. 1 is a block diagram of the system for detection leakage in upstream bandwidth of HFC network.

Ping—When a modem, such as a cable modem (CM) is "pinged" by a command sent to the modem, the modem generates a reply, such as a reply copying a payload message sent to the modem as part of the ping. Typically, a modem returns a packet sent to it, however we use the term more generally hereinbelow, where a ping includes any command sent to a modem, which causes some data to be returned by the modem. The returned data can be, for example, a packet, a series of packets (such as caused by a series of pings), or any other suitable data payload. That is, the term ping, as used hereinbelow includes any suitable command intentionally sent to a modem, which causes the modem to return at least one data packet. The phrase, "command sent to a CM which causes at least one return data packet", can be used interchangeably for the word "ping" in the Application. Ping also includes generation by a CM of any suitable signal into the upstream cable path, including a probing OFDMA signal or an OUDP burst.

The Application is divided into four parts. Part 1 describes leakage detection within the upstream bandwidth of an HFC network using QAM and OFDMA burst techniques. Part 2 describes monitoring leakage in aeronautical band of high split HFC using OUDP leakage detection techniques. Part 3 describes methods of monitoring leakage at aeronautical band of high-split HFC network using CW signals. Part 4 describes a CW-TDMA mode.

Part 1—QAM and OFDMA Burst

As described hereinabove, the task of detecting leakage from the coaxial part of a HFC network is very important, such as, for preventing interference at the aeronautical and LTE bands and for isolation of ingress in the return path of the HFC network. In legacy DOCSIS 3.0 HFC networks, the aeronautical band (108-137 MHz) is overlapped with the downstream bandwidth. For leakage detection, downstream signals such as analog video carriers or pilots are injected into a guard bandwidth between downstream QAM channels, or there can be cross correlation detection of the QAM downstream channel (See for example, QAM Snare product, <https://www.arcomdigital.com/qam-snare/> available from Arcom of Syracuse, NY), or for DOCSIS 3.1 networks, detection of pilot harmonics of the OFDM signal (See for example, U.S. Pat. No. 9,832,089, also assigned to Arcom Digital LLC, and incorporated herein by reference in its entirety for all purposes) has also been used.

Leakage detection at the aeronautical band can also be used for the location of possible "holes" where ingress is injected into the return bandwidth of the HFC network. This method is based on an assumption that the frequency response of coaxial cable at point of generation leakage at the aeronautical band is similar to the frequency response of the point injection Ingress at an upstream bandwidth of 5-42 MHz.

The problems of detecting leakage at modern HFC DOCSIS 3.1 and next generation of DOCSIS 4.0 (Full Duplex) networks are increased due to the following factors.

The first important factor is that modern DOCSIS 3.1 and 4.0 networks migrate to high split systems with return bandwidths of up to 204 MHz, and up to 684 MHz in the case of full duplex (FDX). In this scenario the aeronautical band 108-137 MHz will be overlapped with upstream bandwidth where a leak signal can be created by upstream signals from a cable modem (CM).

Until the new system and method of this Application, leakage detection at upstream bandwidth was simply not carried out and there are few known methods and apparatus for such detection.

A first problem in detection of upstream leakage signal is the fact that this is a spread spectrum ATDMA SC-QAM or OFDMA burst signal. Detection of these signals is a much more difficult task compared with detection of a downstream analog video carrier or CW pilots, because upstream bursts look like noise signals, and upstream traffic from CMs is a very random process. For example, while patrolling for leakage, some CMs could be in a stand-by mode and not generate any upstream bursts. The next problem of detection burst leak signal is the presence at upstream bandwidth of ambient impulse noise. This impulse noise can have the same structure as the burst signal from CMs and as a result, impulse noise provides an interfering impact on a leak detector by creating false leak alarms.

The second relevant aspect of detection of leakage at the upstream bandwidth is location of possible zones where ingress enters the network at the upstream bandwidth. First, detection of leakage at the same upstream bandwidth will definitely be a more accurate indicator for the location of potential "holes" of injection Ingress into coaxial cable as compared to using downstream bandwidth. Second, it is well known that the majority of "holes" where ingress is injected into the network are located at the drop portion of the network, because the quality (shielding efficiency) of drop coax cable is not as good as the quality of trunk cable. Additionally, the level of upstream signals at the drop network is from +35 dBmV to +55 dBmV, which is much higher than the level of the downstream signals (0 . . . +10 dBmV).

Such a big difference of signal levels allows for the reasonable assumption that the location of ingress "holes" at drop lines via detection of upstream leaks, will be more effective, compared to detection of leaks from low level downstream signals because the upstream signal levels are inherently larger.

As was noted above, status quo, there typically is no leakage detection performed at the upstream bandwidth and there are few special methods and apparatus for this sort of leak detection. Of course, for detection of return leakage, modern spectrum analyzers (SA) with FFT overlapping mode and "waterfall" indication could be used. However, a SA is a very expensive tool for mass field application. Because human analysis of measuring results is typically required, this method by SA is not very good for an automatic leak patrolling mode. Also, this SA method does not provide a good validation of upstream bursts in presence of strong ambient impulse noise, which will mask the haystack spectrums of the ATDMA SC-QAM bursts and the minislot spectrums of OFDMA bursts.

One known method of identification of upstream ATDMA bursts was described in U.S. Pat. No. 8,427,974. The identification process includes triggering on a rising edge of receiving burst signal and then identification of burst type by using a correlation processor for the preamble waveform. This method assumes that preambles of waveforms are known a priori for all Short Grand, Long Grand and Unsolicited Grand bursts, or that the preamble can be extracted by receiving the upstream channel descriptor (UCD) from the CMTS. The correlation method of preamble waveform is an effective method of identification and validation upstream ATDMA burst, but in the scenario of a vehicle patrolling for leakage, receiving UCD from different CMTSs and generation of ATDMA preamble waveforms is not a trivial task, because the UCD could change from hub to hub and from node to node, especially in a distributed HFC architecture (with remote PHY and MAC-PHY). So, this method should be used for a permanent on-line process of receiving UCDs, creating preamble waveforms and re-programming correlation processor. Such an approach will definitely cause an increasing complexity and cost of a leak detection system and would also have limitations in areas with poor communication.

Thus, there is a need for a low cost automatic and valid detection of leakage in the upstream bandwidth, especially for modern HFC. The Application describes new system and method solutions which provide for low cost automatic leakage detection in the upstream bandwidth of the HFC network.

The Application also describes a method to stimulate upstream traffic from groups of CMs located at the leakage patrolling zone by sending pings to IP addresses of corresponding CMs from a database containing CM IP addresses and GPS coordinates of the homes. The Application also describes a method of forcing CMs to transmit burst signals at some selected upstream channel for purposes of upstream leakage detection.

The Application also describes a method of validation upstream leak bursts by analyzing the duration and time stamps of detected impulses, and by auto-correlation detection for the presence of the preamble in ATDMA bursts and/or for cyclic prefix in OFDMA bursts.

The Application also describes a method of identification of the MAC address of the CM which generated the detected upstream leak signal.

The Application also describes a method of detection of potential ingress events at the return path of HFC by analysis of leak signals and ambient impulse noise.

The Application also describes a low-cost apparatus for the automatic detection and validation leakage at upstream bandwidth of an HFC network, including a field meter with a GPS receiver and a wireless modem, a remote leakage server and a software core for stimulation of upstream traffic from CMs.

An exemplary system for detection leakage at upstream bandwidth of HFC network according to the Application as illustrated in the schematic block diagram of FIG. 1 is now described in detail. The exemplary system of FIG. 1 includes a field leakage detector 114 installed on any suitable vehicle, such as truck 101, and leakage data server 105. Field leakage detector 114 includes burst leak detector 102, GPS receiver 103 and wireless modem 104. Leakage data server 105 includes database 115 with the physical and IP addresses of the CMs and core for ping IP addresses of CMs in coaxial network 106.

The exemplary system of FIG. 1 works as follows: Leakage detector 114 sends each second report to leakage data server 105 with results of detection and the current GPS coordinates of truck 101. Leakage data server 105 selects in database 115, CMs 107, 108 and 109, which are located in the zone of truck 101, and send pings to IP addresses of CMs 107, 108, 109. The server 105 generates sequential pings to provide a continuous upstream traffic from CMs 107, 108 and 109. When the truck 101 moves to other locations, the server 105 will select other groups of CMs at nearest proximity from truck 101 for pings based on the GPS determined location of truck 101. This process can continue uninterrupted during a leakage patrol.

In the case of a shielding fault 112 (which creates a leak in network 106) the upstream burst signal 113 from CM 107 will generate a leak signal 110. This leak signal 110 is received by burst leak detector 102 simultaneously with interfering ambient impulse noise 116 from different unrelated industrial sources 117. Leak detector 102 measures parameters of each impulse and provides a validation of an actual burst leak signals and prepares report to server 105 with leak and impulse noise data.

For validation of actual upstream bursts and differentiating actual upstream bursts from ambient impulse noise at detector 102, a process algorithm of the new method includes three stages: 1) analysis of the duration of the detected impulses; 2) detection of a preamble of ATDMA bursts and/or cyclic prefix in OFDMA burst; and 3) analysis of time stamps of the detected impulses.

Note that the Application uses an auto-correlation method for the detection preamble of ATDMA burst and cyclic prefix of OFDMA bursts which, different from the methods of the '974 patent, does not require a priori information about the preamble waveform and/or permanent on-line receiving UCD from CMTS, or from leakage data server 105. This provides a new method which is described hereinbelow in more detail and offers much more flexibility and simplicity of detection method.

Figure 2:
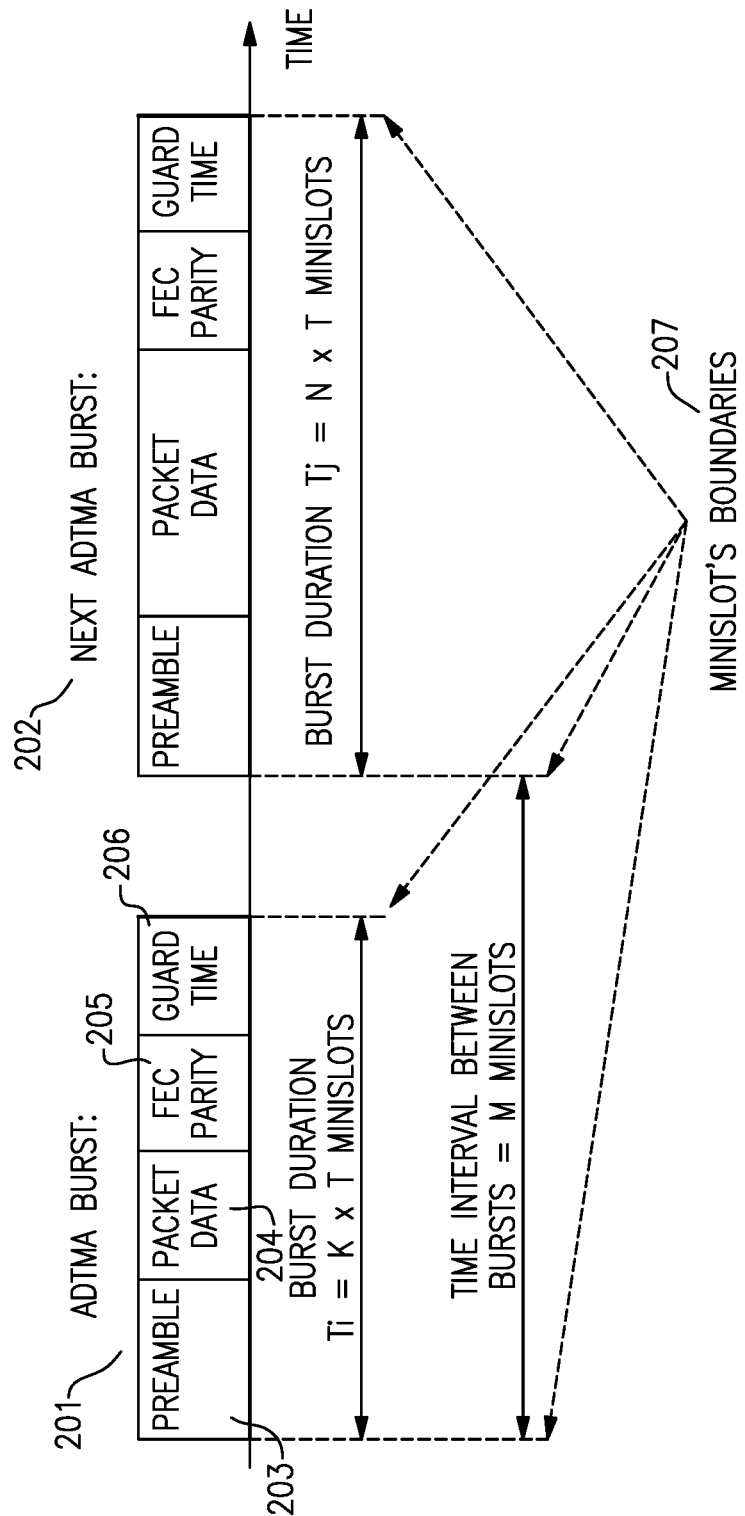
FIG. 2 is a time domain diagram of ATDMA burst signal.
Figure 3:
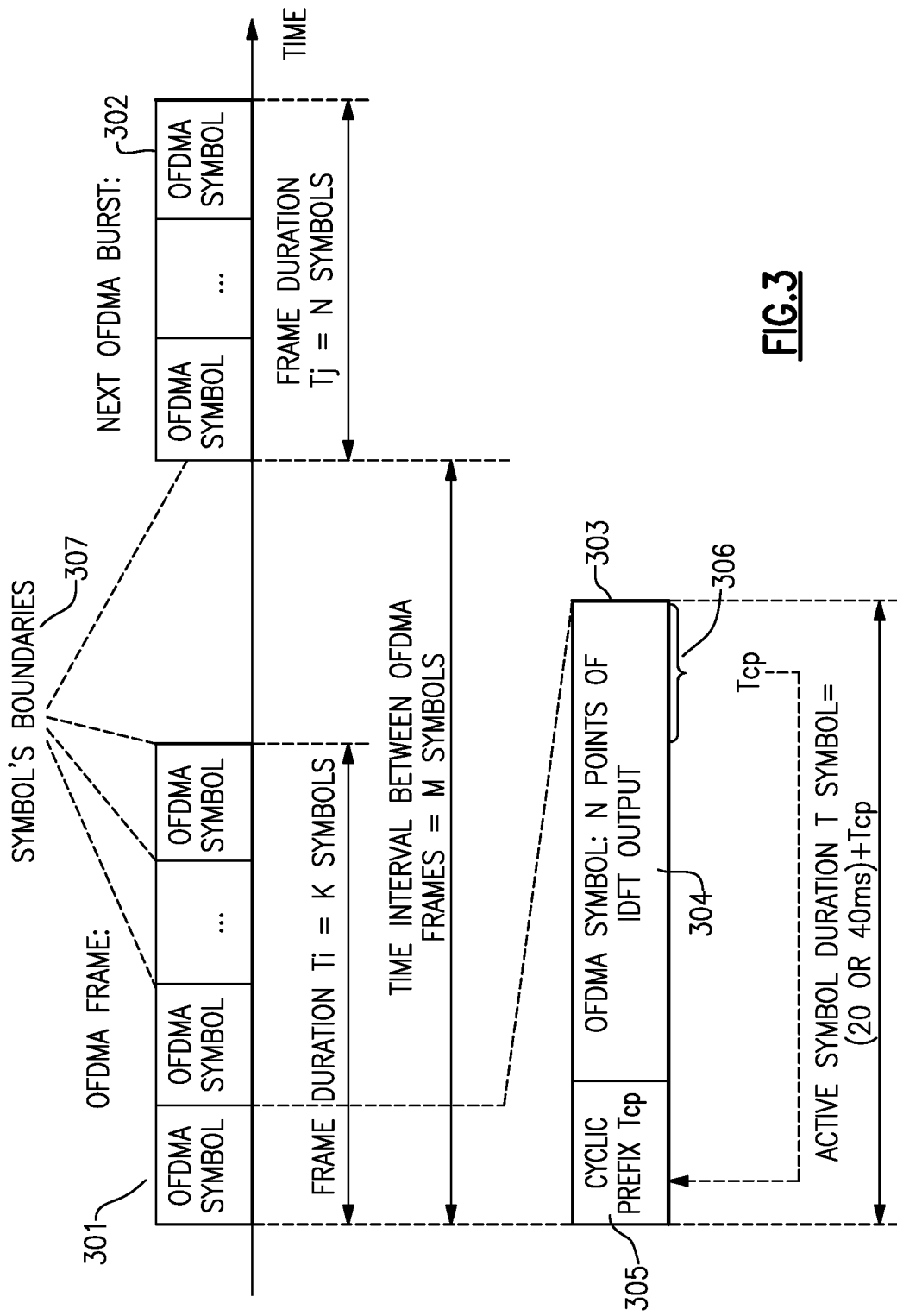
FIG. 3 is time domain diagram of OFDMA burst signal.

For a better understanding validation algorithm of burst leak signal the time diagrams of ATDMA and OFDMA bursts are shown in FIG. 2 and FIG. 3 accordingly.

ATDMA burst 201 of FIG. 2 includes preamble 203, packet data 204, FEC Parity 205 and Guard time interval 206. The duration of burst 201 Ti is equals to integer number K of minislots: Ti=K×T minislots, where K=2, 3 . . . 255.

The next burst 202 starts from the moment of time t=M minislots relative to burst 201. The rising edges of all of the ATDMA bursts are located in minislots on a time grid. This fact allows, as described in more detail hereinbelow, for the time stamp of a rising edge to be used for validation ATDMA bursts. The duration of one minislot is an integer value of tick 6.25 μs. The typical number of ticks in a minislot for SC-QAM 64 is 1 or 2. The maximal number of minislots in one burst is 255. Thus, the expected range of durations ATDMA bursts approximately can be estimated as follows:

Ti(min/max)=(2×T minislot×1 ticks)/(2×T minislots×2 tick×255)=from 12.5 μs to 6,375 μs.

However, the maximal duration of bursts is typically less than 255 minislots and limited in CMTS and/or by the IUC "Max burst" parameter in UCD. From a practical observation, the typical maximal duration of ATDMA bursts is no more than about 3 to 4 ms. It should be note, that actual active duration of ATDMA burst is less on guard time 206 (FIG. 2). The typical guard time is approximately 0.5 to 1 μs, so, this is a very small part of the bursts, but the guard time should still be taken into consideration when performing a validation of the duration of the ATDMA bursts.

FIG. 3 shows a time domain diagram of an OFDMA burst signal. The duration of OFDMA bursts 301 and 302 is defined by integer number of active symbols in frame. The duration of active OFDM symbol 303 Tsymbol is 20 μs for a 4 k FFT mode or 40 μs for an 8 k FFT mode plus duration of cyclic prefix 305 (0.9375 . . . 6.25 μs). The cyclic prefix 305 is part 306 of OFDMA symbol 304, so, the waveform of cyclic prefix is the same as at the end of OFDMA symbol and this property can be used for the validation of OFDMA bursts. The number of symbols contained in one frame is typically from 6 to 36. Thus, the range of duration or the OFDMA bursts is approximately from 125 μs to 1.665 ms. Note that the time interval between OFDMA bursts is also an integer number of M active symbols, so, the time stamps of rising edge can be used for validation of the OFDMA bursts.

As was noted hereinabove, detection and validation of upstream leak bursts will be impacted by ambient impulse noise. The classical source of ambient impulse noise is power line arcing (e.g. source 117 in FIG. 1). Cablelabs document CM-GL-PNMP-V02-110623 DOCSIS® Best Practices and Guidelines, Jun. 23, 2011 describes test results of investigation impulse noise in many nodes. Based on these tests results Cablelabs came to the following conclusion: "Impulses are short in duration, typically less than 20 microseconds (μs), and can fully cover the upstream spectrum . . . From a duration perspective, it can be observed that most impulses have a duration that lasts less than 10 microseconds".

Figure 4:
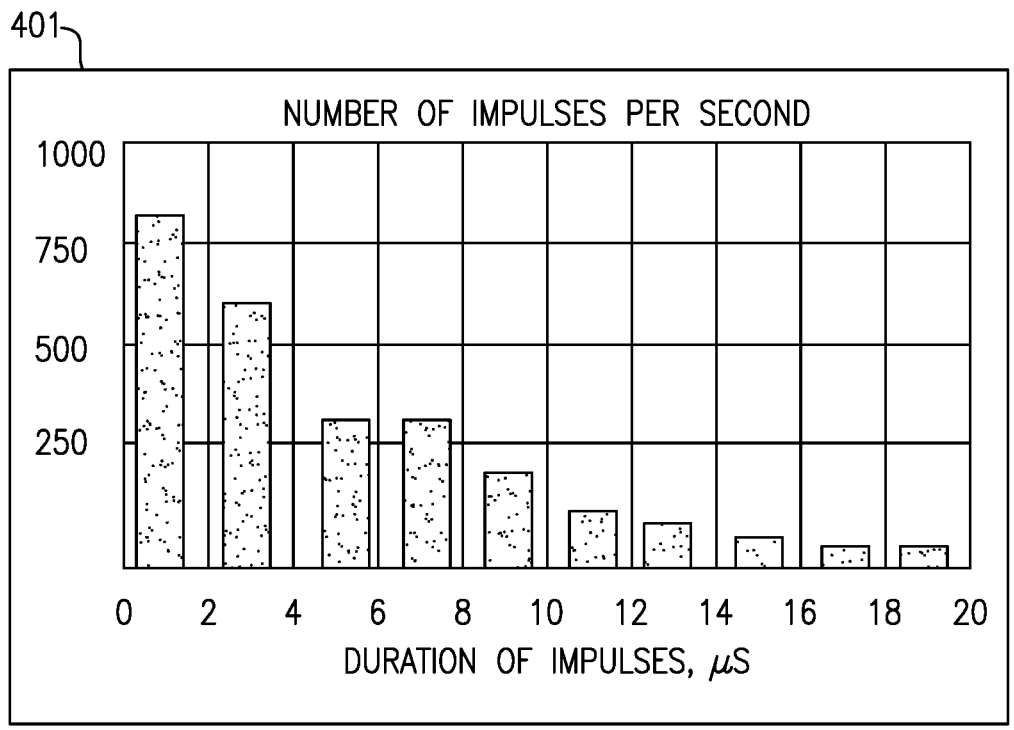
FIG. 4 illustrates typical histograms of distribution durations for impulse noise and upstream bursts.
Figure 4:
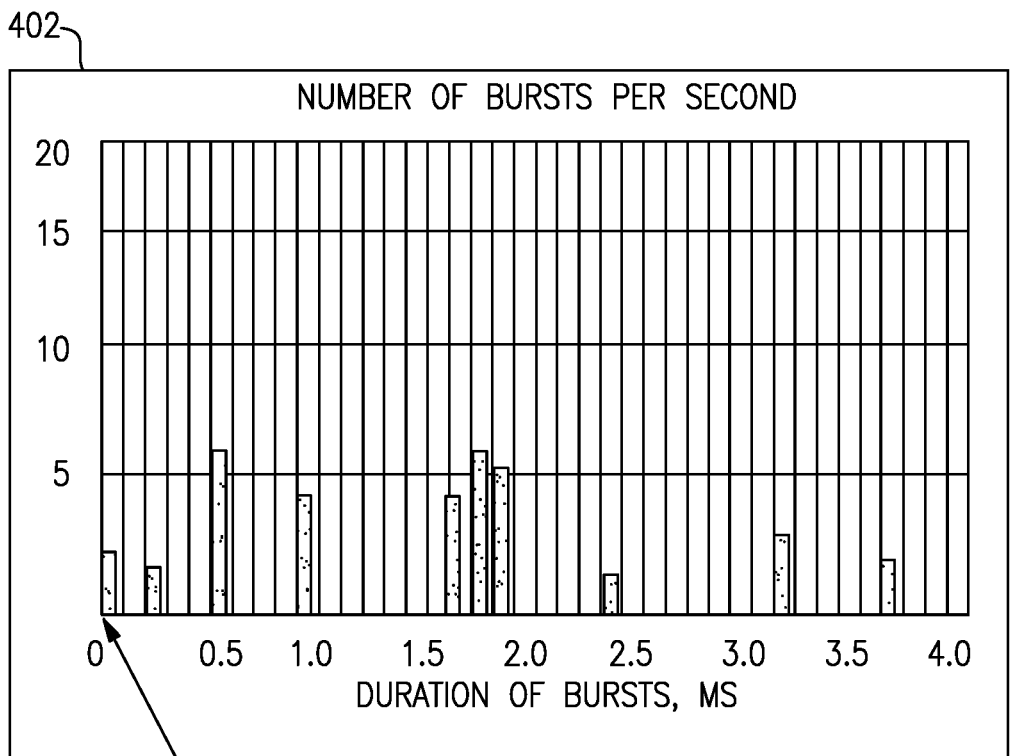

The typical histogram of a number of impulses vs durations for ambient industrial impulse noise is shown in FIG. 4, histogram 401. But it should be noted, that histogram 401 is relevant for impulse noise within a full upstream bandwidth, while power line arcing can generate series of short pulses, which after passing through a band pass filter of an upstream receiver will intertwine and look like one to a few pulses with a duration similar to the duration of upstream bursts. Therefore, where the duration of the noise impulses falls within the range of duration of upstream bursts, it would be not be correct to simply exclude these cases, because they might be actual upstream bursts.

FIG. 4 shows a typical histogram 402 for upstream bursts. The level of the bars (number of bursts within different intervals of durations) is typically very random and depends from upstream traffic from the CM and the settings (UCD) at CMTS. The short duration bursts 403 in histogram 402 are ATDMA Request bursts. This type of burst is not good for leak detection because its duration is within range of durations impulse noise (histogram 401). Most preferable for leak detection in case of ATDMA are Long Grand (more that 128 bytes) bursts which are used for ping response. The duration of these bursts is more than 20 μs which allows one to exclude the majority of noise impulses from an analysis for validation leak signal.

Figure 5:
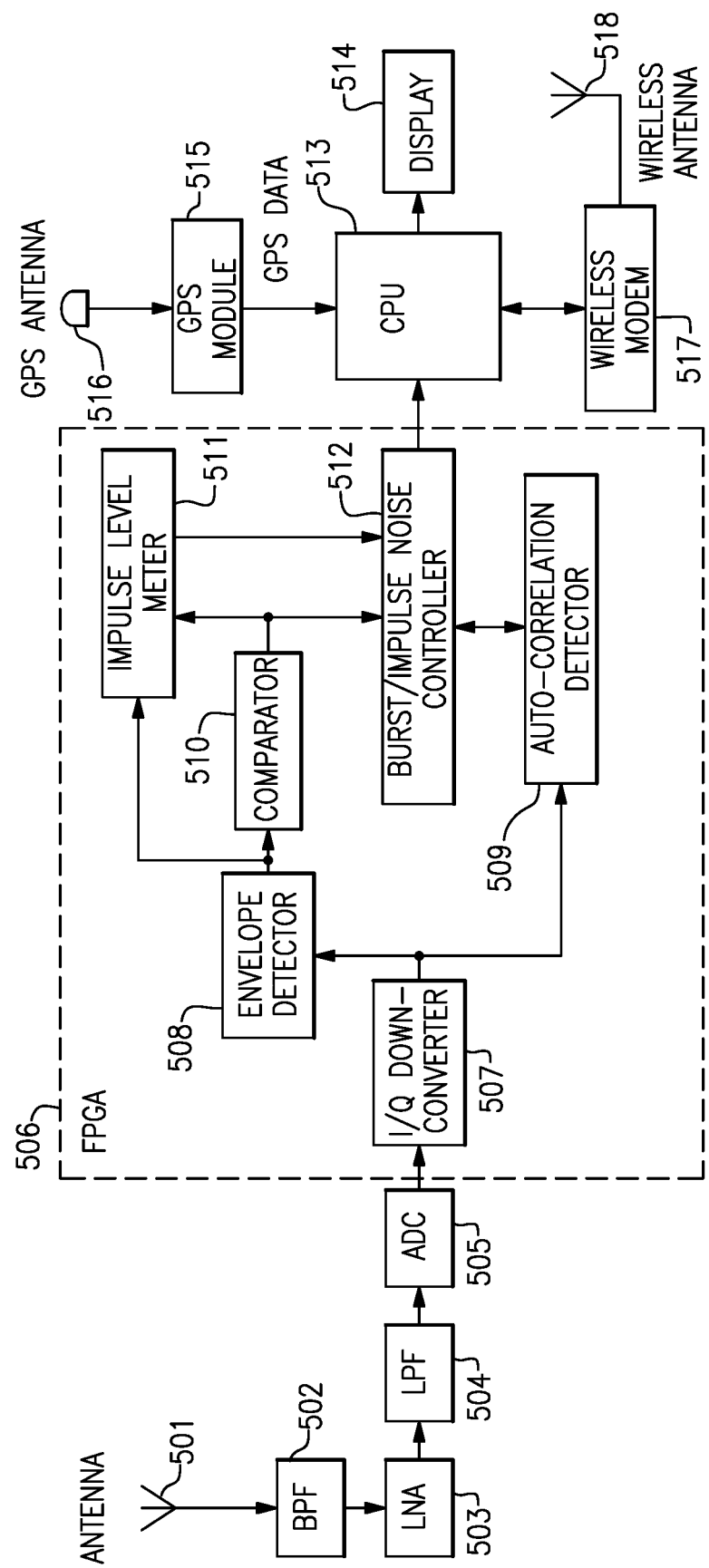
FIG. 5 is block diagram of upstream leak detector.

FIG. 5 is a block diagram showing an upstream leakage detector according to the Application.

This block diagram is common as for detection ATDMA and OFDMA bursts. Note, according to DOCSIS 3.1 specs ATDMA SC-QAM, an upstream signal can be used only up to 85 MHz. At higher frequency bands an OFDMA signal should be used. This means that at the aeronautical band of 108-137 MHz OFDMA burst leak detection should be used.

The detector of FIG. 5 includes: leak antenna 501, band pass filter (BPF) 502 for rejection out of Rx bandwidth interfering signals, low noise amplifier (LNA) 503, low pass filter (LPF) 504, analog-to digital converter (ADC) 505, FPGA 506, CPU 513 with display 514, GPS receiver 515 with antenna 516 and wireless modem 517 with antenna 518.

FPGA 506 is for the detection of burst leak signals. Digital samples from ADC 505 comes to the input of I/Q down-converter 507 which is tuned on a central frequency of an ATDMA channel with a bandwidth 6.4 or 3.2 MHz. In the case of detection of OFDMA bursts, the central frequency of the down-converter 507 should be tuned to a central frequency of an OFDM spectrum between adjacent OFDMA minislots. I/Q samples from down-converter 507 come to the input of envelop detector 508.

Figure 6:
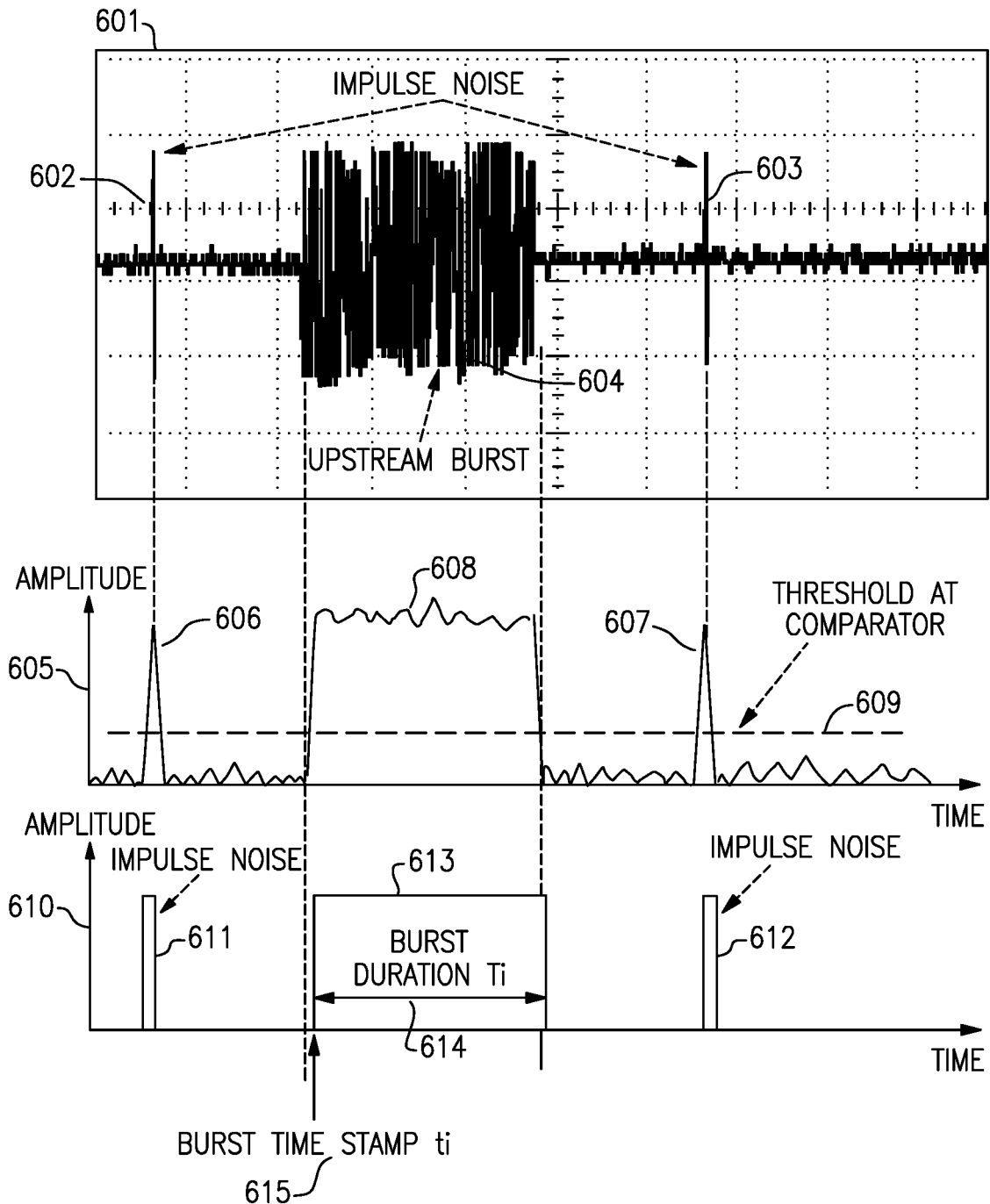
FIG. 6 is time diagram illustrated detection envelope, time stamp and duration of impulses.

FIG. 6 shows an exemplary impulse signal 601 at the input of ADC 505 and the signal 605 at the output of the envelop detector 508. The input signal 601 includes upstream burst 604 and noise impulses 602 and 603. The output signal 605 of envelope detector 508 includes envelope 608 of burst 604 and envelopes 606, 607 of noise impulses 602 and 603. The signal 605 from output of envelope detector 508 comes to input of comparator 510 which detects the rising and falling edges of the envelope signals. The threshold of the detection is shown as dashed line 609. Plot 610 shows the signal at the output of comparator 510. Square pulses 611 and 612 correspond to noise impulses 606 and 607 and pulse 613 correspond to the burst signal 608.

Now, referring to both FIG. 5 and FIG. 6 together, signals from comparator 510 come to the inputs of impulse level meter 511 and to input of controller 513. Impulse level meter 511 calculates the RMS level of the top of the envelope signals 605 from output of the envelope detector 508. Data with impulses levels (Li) from meter 511 come to controller 512. Controller 512 measures time stamps 615 (ti–time of rising edge) and duration 614 (Ti–time interval between rising and falling edges) of each pulse at the output of comparator 510. As a result, each detected impulse is associated in controller 512 with the following data: time stamp ti, duration Ti and level Li. Note that time stamp ti is measured from the start time (zero time point) of a measuring session at controller 512. A measuring session at controller 512 is defined as the time interval during which controller 512 collects data. At the end of a measuring session, controller 512 sends data to CPU 513 and then starts a new measuring session. In the case of a patrolling leak detection truck, the reasonable duration of measuring session is about one second.

Referring again back to block diagram in FIG. 5, the I/Q samples from down-converter 507 also comes to inputs of auto-correlation detector 509. Auto-correlation detector 509 provides validation of ATDMA bursts by the detection of a presence of a preamble at the detected impulse or a validation of the OFDMA bursts by detection of the presence of an OFDM cyclic prefix. Controller 512 provides control and analysis data from auto-correlation detector 509.

Figure 7:
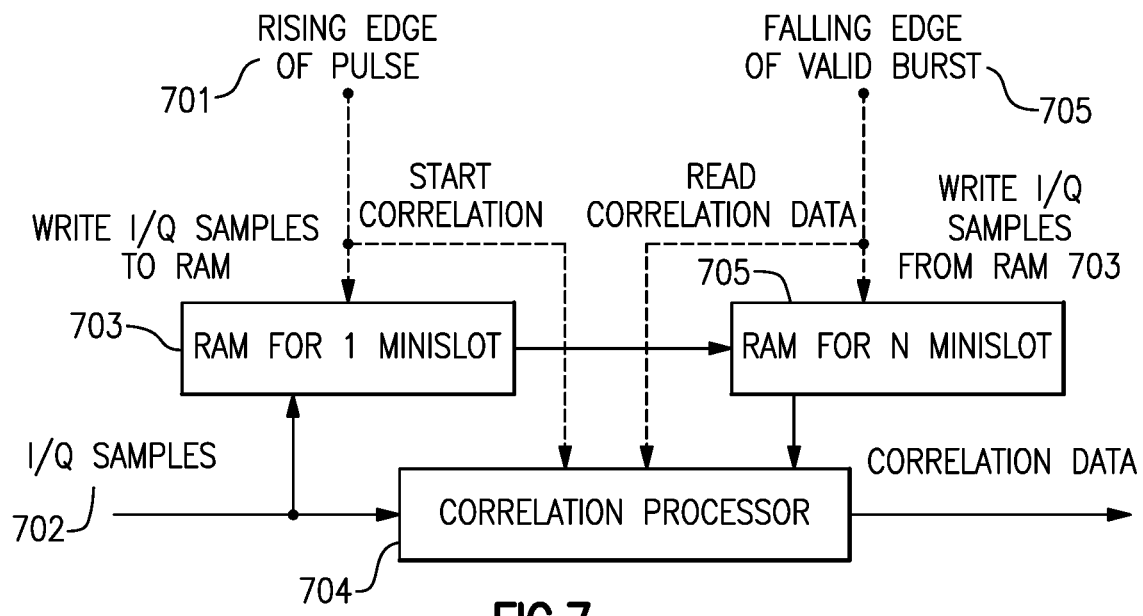
FIG. 7 is block diagram of auto-correlation detector preamble ATDMA bursts.

FIG. 7 is a block diagram showing an auto-correlation detector for ATDMA preambles.

Figure 8:
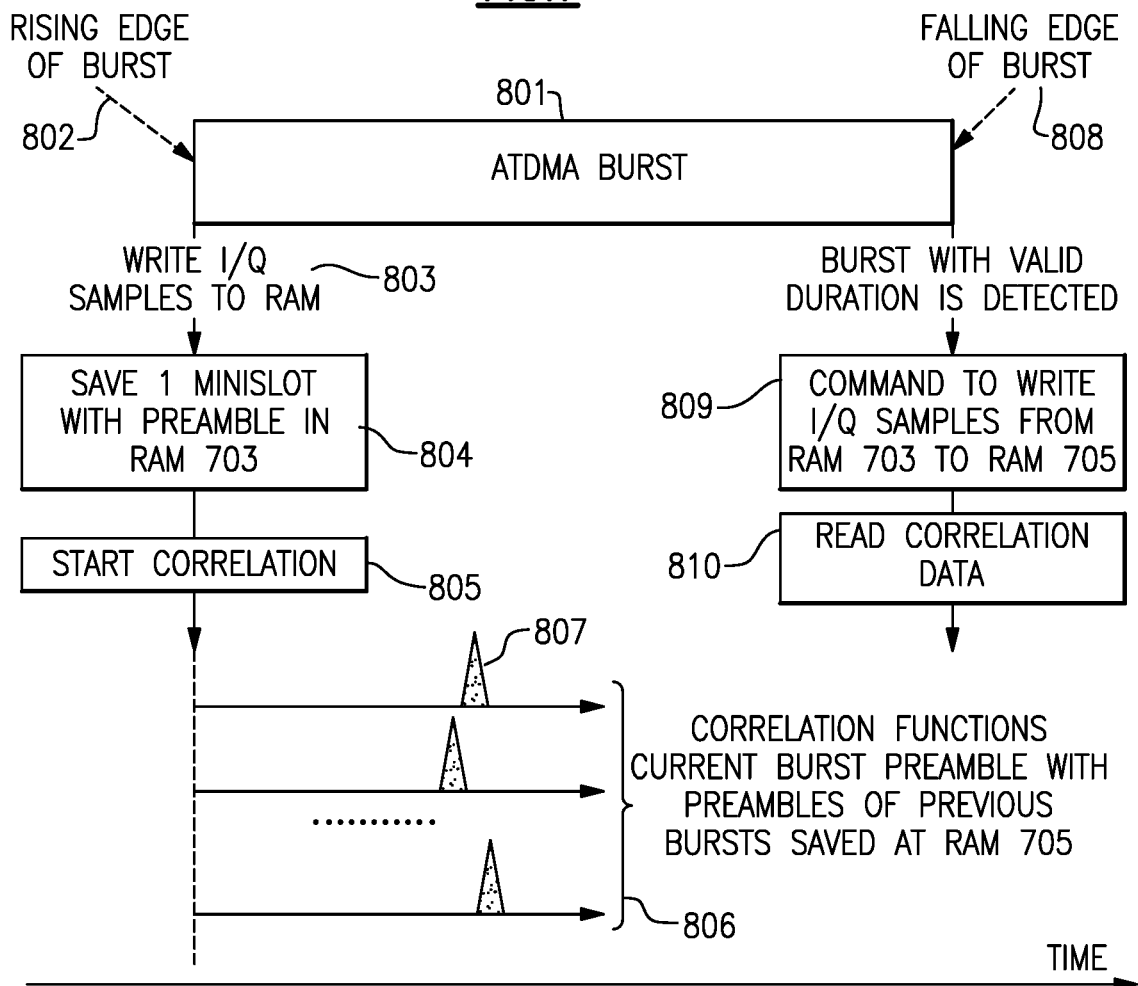
FIG. 8 is time diagram illustrated detection preamble of ATDMA bursts.

FIG. 8 is a time diagram for the detection of preambles by the auto-correlation detector of FIG. 7. The idea of detection preamble is based on an assumption that more than two bursts with the same preamble will be detected during measuring sessions. In other words, event of detection preamble at current ATDMA burst means that early during the current or the previous measuring session at least one burst with the same preamble was detected. The advantage of this auto-correlation method is that information about the waveform of the preamble is not required at all. Note that the efficiency (peak to noise ratio) of the auto-correlation detector is no worse than the efficiency of optimal matching filter in a case where the signal-to-noise ratio>0 (the exact scenario of detection of impulses at comparator 511).

The auto-correlation detector of FIG. 7 works as follows. The I/Q samples come both to the input of correlation processor 704 and the input of RAM 703. Write command 701 (803 in FIG. 8) to RAM 703 comes from controller 512 synchronous with the rising edge 802 of each detected impulse 801. As an example, FIG. 7 and FIG. 8 show that RAM 703 stores I/Q samples corresponding a duration of one minislot 804. In the case of SC-QAM 64 at Short Grand and Long Grand bursts, typically one minislot (32 symbols or 64 QPSK bits) is used for the preamble. Parallel with recording data into RAM 703 correlation processor 704 starts (command 805) calculation of the correlation functions 806 between input I/Q samples and I/Q samples stored at RAM 705. Note that, at the beginning of measuring session, RAM 705 stores samples from the previous measuring session.

After the detection of the falling edge 808 of an impulse 801, controller 512 measures the pulse duration Ti, and if the duration Ti is within an expected interval for a burst leak signal, then controller 512 sends command 705 (810 in FIG. 8) to read the correlation data and command 809 to re-write I/Q samples from RAM 703 to RAM 705. Correlation data 806 (a set of correlation functions between preamble of current burst 801 and N previous bursts with valid duration) comes to controller 512 for analysis. If a peak 807 is detected at one of the correlation functions 806, then the current detected pulse is identified in controller 512 as a valid ATDMA burst.

The number N of stored minislots with I/Q samples in RAM 705 should be limited depending on the productivity of the correlation processor 704 to provide a calculation of all of the correlation functions 806 until the falling edge 809 of burst 801. The minimal number is N=1. Detection of a preamble event occurs when two pulses are detected in a row with valid duration, and both pulses have the same preamble. Detection of a preamble event during a one second measuring session while pinging CMs is likely, especially where the Shot Grand and Long Grand bursts both have the same preamble (a common scenario). However, to increase the probability of detection different preambles for a majority of valid bursts, it makes sense to select a bigger value of N, for example N=8 . . . 32.

Figure 9:
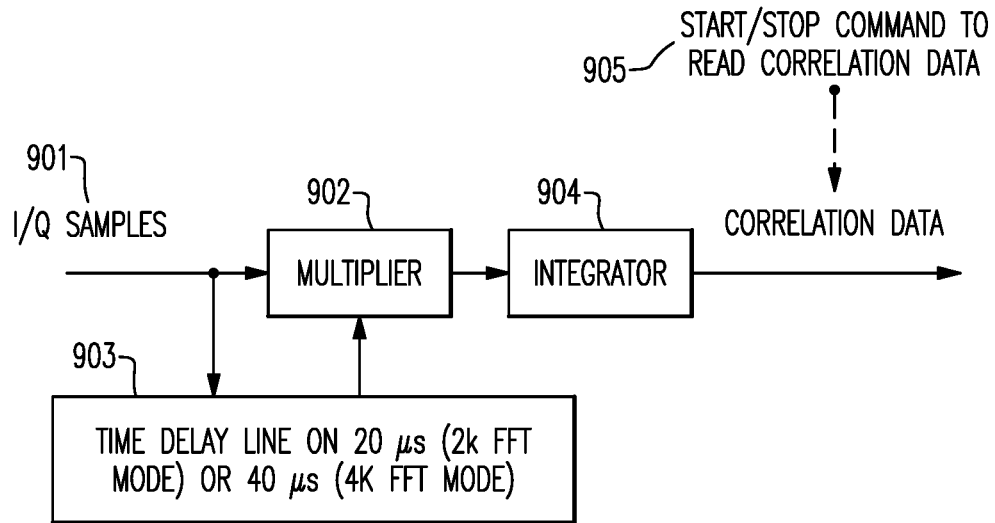
FIG. 9 is block diagram of auto-correlation detector cyclic prefix OFDMA bursts.
Figure 10:
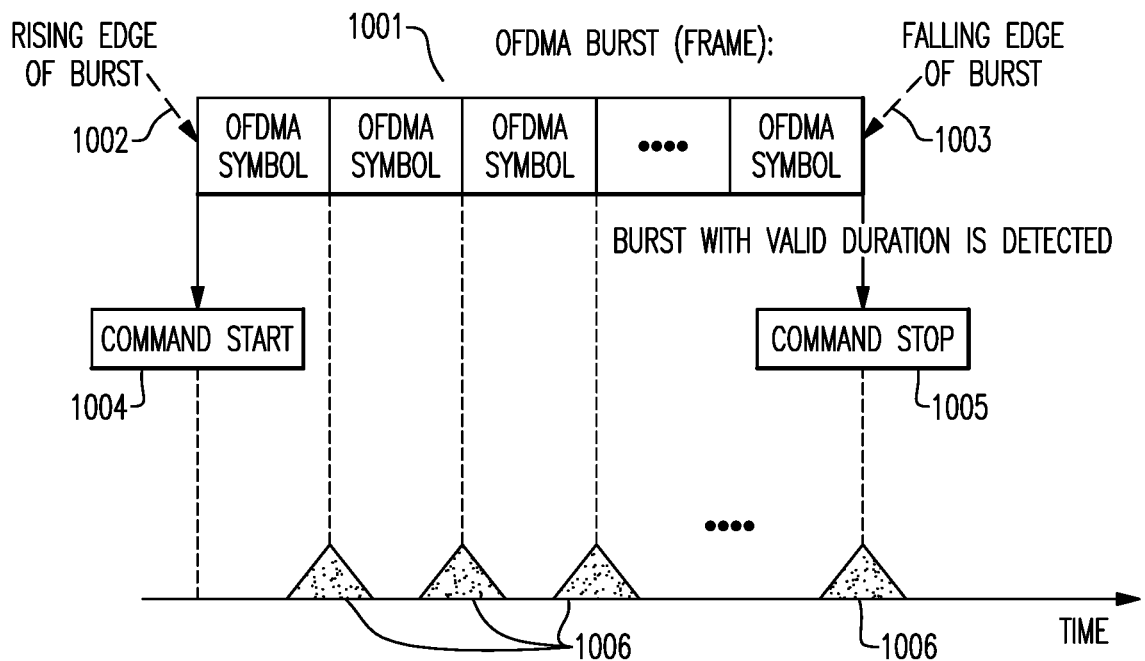
FIG. 10 is time diagram illustrated detection cyclic prefix of OFDMA bursts.

FIG. 9 is a block diagram of an OFDMA cyclic prefix auto-correlation detector. FIG. 10 is a time diagram showing an exemplary detection of a cyclic prefix.

The process of calculation of the auto-correlation process function is controlled by commands Start/Stop 905 (1004, 1005 in FIG. 10) from controller 512. The Start/Stop commands are triggered by the rising 1002 and falling 1003 edges of detected impulse 1001 accordingly. I/Q samples 901 come to the input of the multiplier 902 and to the input of the time delay line 903. The time delay in line 903 is 20 μs in a case of the 2 k FFT mode or 40 μs in a case of the 4 k FFT mode. If the FFT mode is prior un-known or can be changed from node to node, then auto-correlation processor 509 should include two working channels in parallel for the 2K and 4K FFT modes. If a detected pulse is OFDMA bursts, then I/Q samples at the input of multiplier 902 will be coherent (have the same waveform) during the cyclic prefix, so, at the output of multiplier at the moment of an arriving cyclic prefix there will be formed a square pulse with a positive amplitude and a duration of cyclic prefix. In other moments of time in the inputs of multiplier 902 there will be un-correlated samples from the OFDM symbol, and as a result at the output of multiplier there will be a bi-polar noise signal. The signal from multiplier 902 comes to the input of Integrator 904 when the integration time is equal to a duration of the cyclic prefix. If the duration of the cyclic prefix is prior unknown, then a multi channel (11 channels) integrator should be used for all possible duration of cyclic prefix at OFDMA signal:

| Upstream Cyclic Prefix | 0.9375 µs | (96 * $T_{su}$) |
|---|---|---|
| | 1.25 µs | (128 * $T_{su}$) |
| | 1.5625 µs | (160 * $T_{su}$) |
| | 1.875 µs | (192 * $T_{su}$) |
| | 2.1875 µs | (224 * $T_{su}$) |
| | 2.5 µs | (256 * $T_{su}$) |
| | 2.8125 µs | (288 * $T_{su}$) |
| | 3.125 µs | (320 * $T_{su}$) |
| | 3.75 µs | (384 * $T_{su}$) |
| | 5.0 µs | (512 * $T_{su}$) |
| | 6.25 µs | (640 * $T_{su}$) |

In the case of a detection of an actual OFDMA burst, the signal at the output of integrator 904 will include a series of peaks 1006 with a period of an ODFMA symbol. In the case of impulse noise, the peaks 1006 will be absent. Thus, analysis of the auto-correlation process function for the presence of peaks 1006 allows for an effective validation of OFDMA bursts in controller 512. Note that peaks 1006 could be additionally accumulated in controller 512, so, the last peak will have a maximal of peak level ratio to noise which allows for a more robust validation.

Referring back to the block diagram of FIG. 5, controller 512 after receiving data from auto-correlation detector 509, assigns detected pulses as either "Bursts leak" (a valid ATDMA or OFDMA) or "Impulse noise". Then, controller 512 splits all detected pulses into two files: a "Burst leak" file and an "Impulse noise" file, and at the end of the measuring session send those files to CPU 513. The file "Burst leak" includes the following data: time stamp ti, duration Ti and level Li for each burst. The file "Impulse noise" includes just the level Li of each impulse.

Figure 11:
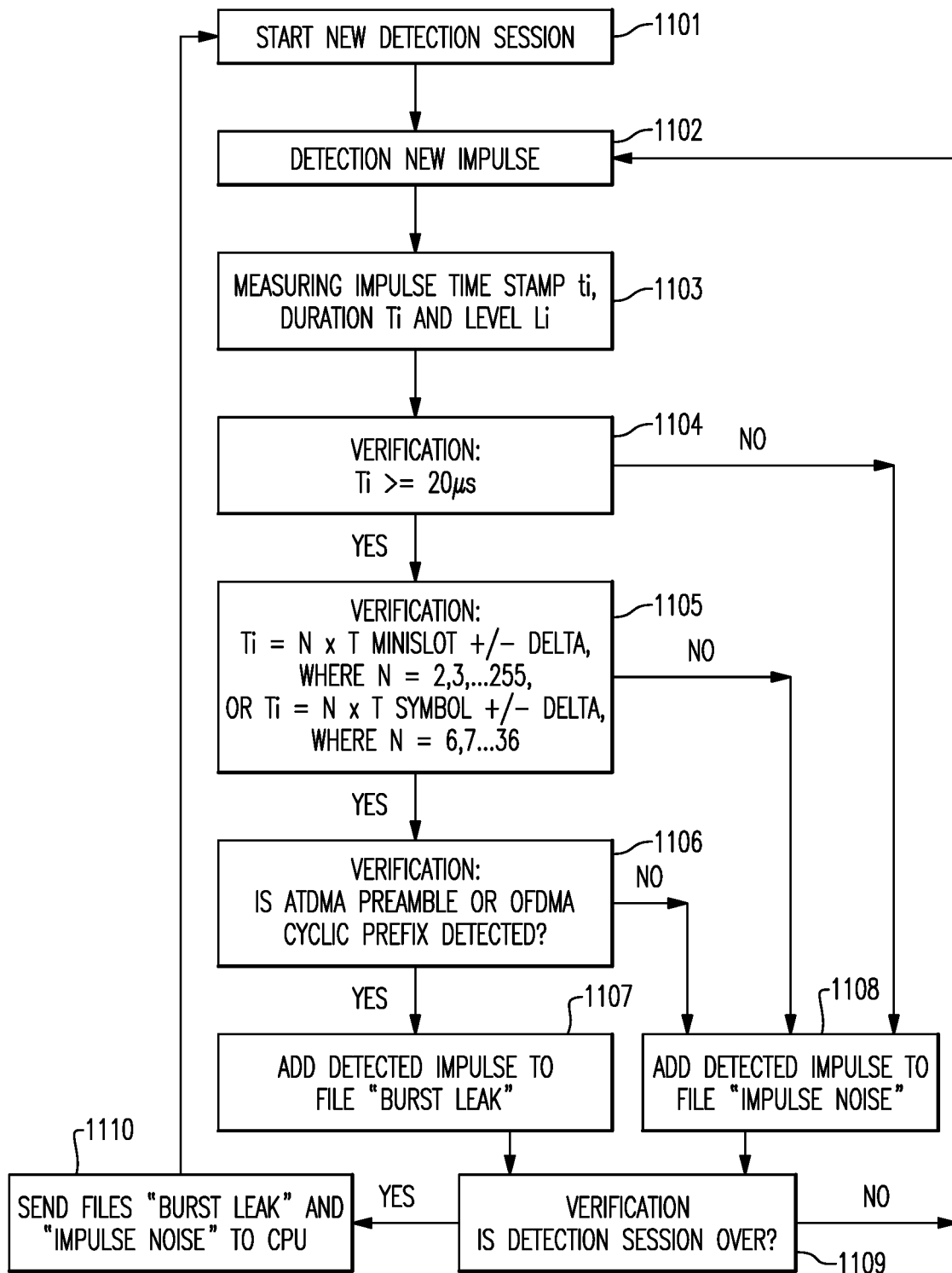
FIG. 11 is a flow diagram outlining algorithm of controller for measuring and validation burst leak signal and ambient impulse noise.

FIG. 11 is a flow chart of an exemplary algorithm which shows more detail of the operation controller 513. After starting a new measuring session at step 1101, the controller detects a new impulse at step 1102, and then at step 1103 measures time stamps ti, the duration of Ti and the level Li of the detected impulse. Then at the next step 1104, controller 512 provides a verification duration of the detected impulse. If the duration is <20 µs, then the pulse is identified as an Impulse noise and is recorded to the corresponding file (step 1108). If the duration of the signal at the output of integrator 904 is >=20 µs, then the at next step 1105, the controller provides a verification if the duration of the detected impulse is matched with the expected durations ATDMA or OFDMA bursts.

The interval "Delta" of the verification step 1105 is selected to cover accuracy of measuring burst duration, inaccuracy of generation bursts in CM. The interval "Delta" of the verification step 1105 is selected to compensate for the inaccuracy of the burst measurement and any inaccuracy in the generation of bursts. For ATDMA bursts, the interval "Delta" should also include the expected Guard time of ATDMA bursts. The typical value of Delta for ATDMA bursts is in range from about 1 to 3 µs.

If the verification at step 1105 is not passed, then the impulse is added at step 1108 into file "Impulse noise". If the verification at step 1105 is okay, then the controller 512 reads correlation data from detector 509 and provides analysis correlation data at step 1106 on the presence of an ATDMA preamble or of an OFDMA cyclic prefix.

If the verification at step 1106 is okay, then the detected pulse is added to file "Burst leak" (step 1107), if not, then the impulse is added to the file "Impulse noise" (step 1108). When the detection session is over (step 1109), controller 512 sends the files "Burst leak" and "Impulse noise" to the CPU 513 (step 1110) and then starts new measuring session (back to step 1101).

Again, referring back to the block diagram of FIG. 5, after receiving file "Burst leak" CPU 513 provides an extra validation of the detected bursts by checking for the condition where the time stamps ti are matched with minislot time grid (207 in FIG. 2) of ATDMA bursts or with symbols time grid of OFDMA bursts (307 in FIG. 3). The algorithm of verification matching with the time grid calculates the offset between t1 (time stamp of first detected burst) and time grid when maximal number of bursts will have matched time stamps+/−some delta (1 . . . 2 µs). After calculation of an optimal offset, CPU 513 excludes from the file "Burst leak" pulses with un-matched time stamps. Thus, the file "Burst leak" will include only bursts which satisfy three validity criteria: 1) duration, 2) presence ATDMA preamble or OFDMA cyclic prefix and 3) matching time stamps with minislot or symbols time grid. It's very robust criteria which excludes any false alarms of leak detection.

At next step, CPU 513 calculates a maximal (Max) level of bursts in the file "Burst leak", and this value then used as estimation of the return leakage level during the measuring session. Also, CPU 513 calculates an average (AVG) level of noise impulses in the file "Impulse noise" and then, this AVG value is used as estimate of the impulse noise level during measured session. Using the Max level for burst leak and the AVG level for impulse noise allows for a more accurate estimate of an interfering event: "worst case" criteria for leakage and "reasonable" criteria for impulse noise.

Then, CPU 513 prepares the following data for indication on the display 514: Leak level, number of detected bursts, Impulse noise level and number of detected noise impulses. Note that, the number of detected bursts provides useful information for extra leak validation. The number of detected noise impulses is also an informative parameter for generating impulse noise alarms. Parallel with the indication data shown on the display, CPU 513 combines measuring data with GPS time stamp and coordinates and sends a report for server 105 via wireless modem 517. This process can be repeated for each measuring session.

Figure 12:
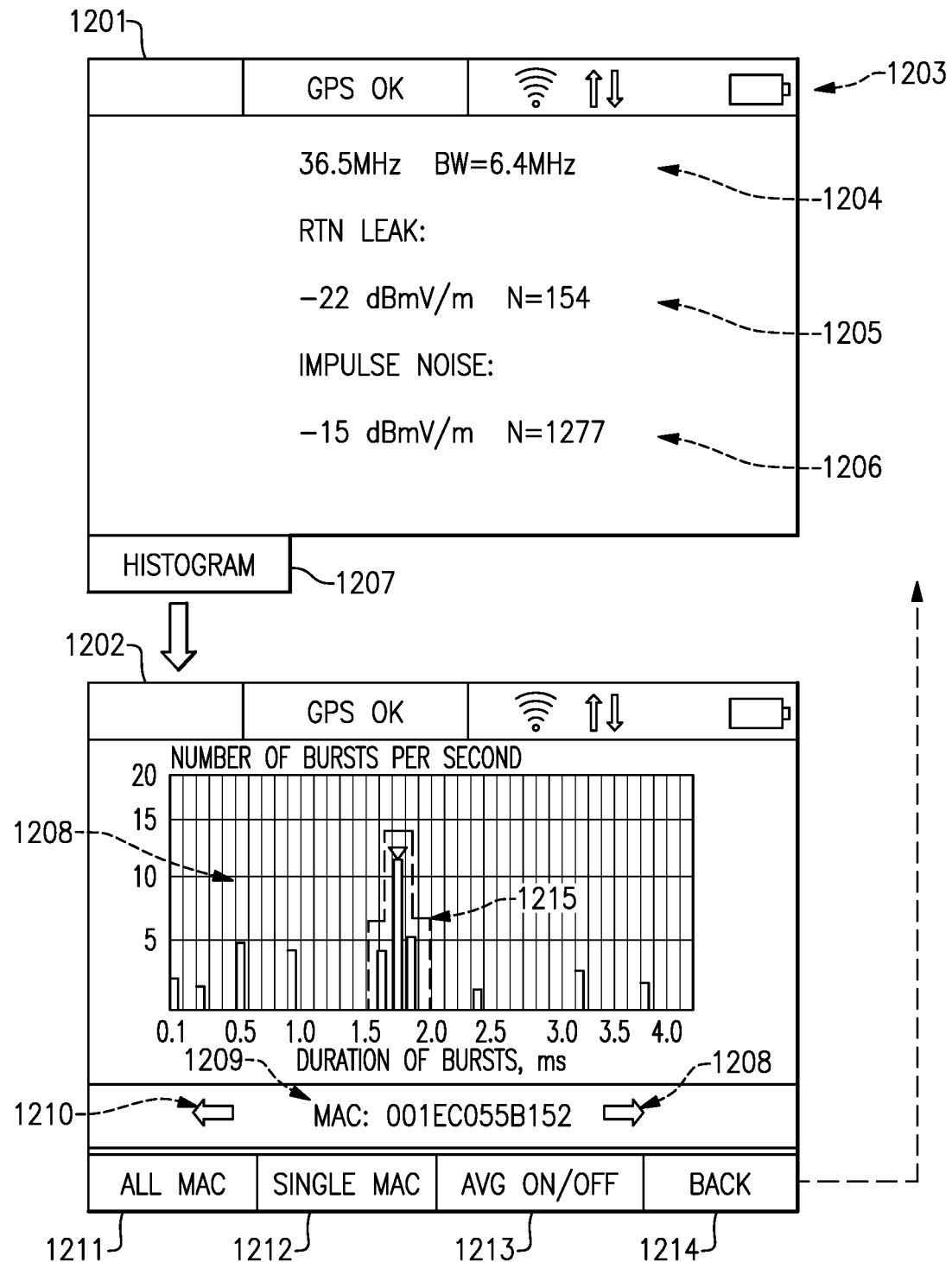
FIG. 12 illustrates two exemplary pages of a leak detector display for the indication of results of detection leak and impulse noise and for the identification of the MAC address of the CM which generated the detected leak signal.

FIG. 12 shows an exemplary variant of a display view of an upstream leak detector. The display has two switched pages main page 1201 with leak and impulse noise levels and density, and second page 1202 with a histogram of the distribution leak burst vs duration. The main page is used to show alarming events of detection leak and impulse noise. The second page with the histogram is used for identification MAC address of CM which generates leak signal.

The main page 1201 includes the row 1203 with icons for indication GPS status, wireless signal strength, data transmission events (blinking arrows) and battery charge status. The next row 1204 indicates the central frequency of the upstream channel and bandwidth. The next two rows 1205 and 1206 indicate the field strength of leak with number of detected bursts, and the field strength of the impulse noise with the number of detected impulses per measuring session accordingly. Note that the simultaneous reporting of the results of the detection of leakage and impulse noise to server 105 and indication on display 514, provides an indication of the most probable zones of injection Ingress (impulse noise) in upstream bandwidth.

There is a hot button, "Histogram" 1207, shown at the bottom of the exemplary main page 1201. After pressing this button, the display will be switched to second page 1202. The "Back" button 1214 is used to switch the display back to main page.

The second page 1202 shows a histogram 1208 of the bursts detected during a measuring session. There are the following hot buttons at this page: "All MAC" 1211, "Single MAC" 1212 and "AVG On/Off" 1213.

The algorithm to the identification of the MAC address of the CM which is the source of leak signal is as follows. After switching to page 1202 the detector will be in a default mode "All MAC" in which server 105 sends pings to all of the CMs around truck 101 (FIG. 1). Then after pressing the button "AVG On" on the display, bars will be accumulated which correspond to the duration of the dominant bursts with ping response data. Those bars are assigned by dotted line 1215. Note, particular duration of bursts corresponding to the response of a CM on pings, depends on the CMTS settings, so, in common cases, it is not easy to calculate the expected bursts durations without having detailed information about the CMTS settings, UCD and etc. The only one practical way is just to measure dominant bursts durations in each particular case. After an accumulation of enough data, the dotted line 1215 will be stabilized. At this moment, it makes sense to press the button "Single MAC", and detector 114 (FIG. 1) will send a request to server 105 to send pings to the first MAC address in the list with all MACs. Server 105 will send a message back to detector 114 with selected single MAC address and start to send pings to the above MAC addresses only. By using arrow buttons 1210, the technician can select the next MAC in the list at server 105 until the bars in the display will not matched good enough with dot line 1215.

Note, in "Single MAC" mode, the technician can also press the "AVG On" button and dotted line 1215 will be saved at display because the reset dotted line 1215 is allowed at "All MAC" mode only. Of course, the process of identification MAC address will improve over time as the technician gains more experience, but the new method and system according to the Application is still a more effective and lower cost method compared with using a directional antenna for location leak source, especially taking into account that at return bandwidth directional antenna will have a very big size making using this antenna unpractical for mobile use on a vehicle.

The new identification MAC address process of location leak (e.g. the shielding fault 112 in FIG. 1) will be much easy for a technician than previous methods of the prior art. For example, in urban areas, the new MAC address method allows a technician to locate an exact apartment where leak is generated. In countryside areas typical across many countries, such as the U.S., identification of a specific MAC address allows for the selection of a drop line and then a near field antenna can be used to find the leak along that particular drop line.

The leakage detector of FIG. 5 according to the Application, can be implemented as a low-cost unit in a compact form factor. There can also be a fully automatic mode which during the vehicle patrol, can automatically store and/or send historical data to the server 105. Following such automatic measurements, a technician will have a chance to check the results of detection leak directly in the field and then identify MAC address of CM generates leak.

Regarding testing in general by pings, we tested different ways to simulate upstream traffic at cable distribution sites in an actual HFC network. Various configurations of reading commands were tested, downstream spectrum capture commands, and ping commands with different rates and payloads (for ping, the size of the test data packet). The conclusion was that the literal command ping was found to be a particularly effective and flexible method for the new system and methods of the Application, because the rate of pings and the payload can both be controlled. However, as described hereinabove in the definitions, we include in our use of the term ping, any suitable command which causes a return of any suitable data packet or data. That is, we use the term ping in the broadest sense to includes other ways of modem stimulation. Also, we noted that particularly in the U.S., upstream traffic is possible, especially including scenario when for monitoring leaks during times with statistically maximal US traffic (such as, for example, in the evening, when people are home and likely to be using the cable modem). In such cases, some upstream leakage measurements can be made without the additional ping stimulation of traffic to cause a simulated upstream traffic from each modem.

Thus, the new method and systems of the Application can also be used efficiently to locate leakage within the upstream bandwidth of a cable network based on upstream traffic related to customer use of the cable modem during higher use periods. In such cases a patrol can be made without a need to ping individual modems. Also, there is still no need to actually decode any of the data transmissions, where the new method and system can verify a leak from the cable system and distinguish the burst or impulse from non-cable system related impulse noise by merely determining the presence of an ATDMA preamble or an OFDMA cyclic prefix without decoding said ATDMA preamble or said OFDMA cyclic prefix.

For example, a method for leakage detection at a return bandwidth of an HFC network without using patrol vehicle generated pings, includes: providing an apparatus for use in a patrol vehicle, the apparatus including a GPS receiver and a burst and impulse noise detector, both coupled to a processor; recording GPS coordinates of a location of the patrol vehicle for correlation to known locations of cable modems (CM); listening for leakage bursts from a group of CM sending upstream data within a current location of the patrol vehicle; detecting by the burst and impulse noise detector both upstream burst leakage and off-air impulse noise; measuring a duration of each detected burst leakage and off-air impulse noise event to classify and separate each detected event as either a leak burst or a noise impulse; and for a verification of each leak burst, detecting a presence of an ATDMA preamble or an OFDMA cyclic prefix without decoding the ATDMA preamble or the OFDMA cyclic prefix.

In summary, a method for leakage detection at a return bandwidth of an HFC network includes: providing an apparatus for use in a patrol vehicle, the apparatus including a GPS receiver and a burst and impulse noise detector, both coupled to a processor; sending GPS coordinates of a location of the patrol vehicle to a leakage data server; selecting a group of cable modems (CM) within a current location of the patrol vehicle; stimulating an upstream traffic by sending pings to the group of CM; detecting by the burst and impulse noise detector both upstream burst leakage and off-air impulse noise; measuring a duration of each detected burst leakage and off-air impulse noise event to classify and separate each detected event as either a leak burst or a noise impulse; for a verification of each leak burst, detecting a presence of an ATDMA preamble or an OFDMA cyclic prefix without decoding the ATDMA preamble or the OFDMA cyclic prefix; and for a further verification of each leak burst, matching a time stamp of each leak burst with a minislot or a symbols time grid.

The step of providing can further include providing a wireless modem, and the step of selecting includes selecting the group of CM within the current location of the patrol vehicle by querying a remote server via the wireless modem.

A method for identification of a MAC address of a cable modem (CM) which is generating a leak signal includes: providing an apparatus for use in a patrol vehicle, the apparatus including a GPS receiver and a burst and impulse noise detector, both coupled to a processor; sending GPS coordinates of a location of the patrol vehicle to a leakage data server; selecting a group of cable modems (CM) within a current location of the patrol vehicle; stimulating the group of CM to provide a stimulated upstream traffic by sending pings to the group of CM; detecting an average (AVG) dominant duration of bursts during the stimulated upstream traffic from CMs within a zone of a detected leak; and stimulating an upstream traffic from each single MAC address of the CMs within the zone of the detection leak one by one until a matching dominant duration of bursts measured during the step of simulating an upstream traffic by sending pings to the group of CMs is found to identify a particular CM associated with an upstream leak.

The method can further include, following the step of stimulating, a step of prioritizing two or more potential ingress events at an upstream bandwidth of a hybrid fiber coax (HFC) system by a comparison of upstream leak noise and ambient impulse noise.

An upstream leak detection system includes a leak detection apparatus configured for use in a mobile patrol vehicle. The leak detection apparatus includes a processor, a GPS receiver and a burst and impulse noise detector, both operatively coupled to the processor. A leakage data server includes a database with cable modems (CMs) physical and IP addresses and a core to stimulate an upstream traffic from a plurality of CM in a current vicinity of the mobile patrol vehicle.

The upstream leak detection system can further include a wireless modem operatively coupled to the processor and where the leakage data server resides on a remote server communicatively coupled to the upstream leak detection system by the wireless modem.

The upstream leak detection system can further include a display to show information about detected leaks or impulse noise.

The upstream leak detection system can further include a display to show a histogram of a number of bursts in a time interval against bins of duration of bursts.

The upstream leak detection system can further include a display to show information about detected leaks or impulse noise.

The upstream leak detection system can further include a display to show a histogram of a number of bursts in a time interval against bins of duration of bursts.

The burst and impulse noise detector can include an antenna operatively coupled to a detection of burst leak signals circuit via at least one of a filter and an amplifier.

The burst and impulse noise detector can include an antenna operatively coupled to the detection of burst leak signals circuit via a bandpass filter (BPF), and low noise amplifier (LNA), and a low pass filter (LPF).

The burst and impulse noise detector can include an antenna operatively coupled to a detection of burst leak signals circuit via at least one of the filter and the amplifier and following the at least one of the filter and the amplifier, an analog to digital converter, to digitize received bursts coupled to the detection of burst leak signals circuit.

The detection of burst leak signals circuit can include an I/Q down converter coupled to an envelope detector and an autocorrelation detector. An impulse level meter and a comparator are coupled to the envelope detector. A burst/impulse noise controller is coupled to the comparator, the impulse level meter, and the autocorrelation detector. The burst/impulse noise controller is adapted to provide information about each impulse or burst for a determination of a duration of the impulse or burst, an indication if each received impulse or burst includes a preamble of an ATDMA burst or a cyclic prefix of a OFDMA burst, and a time stamp of the received impulse or burst by the detection of burst leak signals circuit operating in conjunction with the processor operatively coupled to the detection of burst leak signals circuit.

The autocorrelation detector can include a correlation processor which detects an ATDMA preamble by a start of correlation based on a rising edge of a pulse indicative of a start of the ATDMA burst, and a falling edge indicative of and end of the ATDMA burst based on a number of minislots.

A method for leakage detection at a return bandwidth of an HFC network includes: providing an apparatus for use in a patrol vehicle, the apparatus including a GPS receiver and a burst and impulse noise detector, both coupled to a processor; recording GPS coordinates of a location of the patrol vehicle for correlation to known locations of cable modems (CM); listening for leakage bursts from a group of CM sending upstream data within a current location of the patrol vehicle; detecting by the burst and impulse noise detector both upstream burst leakage and off-air impulse noise; measuring a duration of each detected burst leakage and off-air impulse noise event to classify and separate each detected event as either a leak burst or a noise impulse; and for a verification of each leak burst, detecting a presence of an ATDMA preamble or an OFDMA cyclic prefix without decoding the ATDMA preamble or the OFDMA cyclic prefix.

The autocorrelation detector can include an OFDMA cyclic prefix auto-correlation detector including at time delay line and a multiplier-integrator wherein correlation is based on a time delay of 20 µs in a 2 k FFT mode or 40 µs in a 4 k FFT mode during a burst start-stop interval.

Part 2—OUDP Leakage Detection

OUDP (OFDM Upstream Data Profile) is built into some of the various DOCSIS® specifications. While OUDP was not intended to be used for leakage testing, we realized that combined with some of the new methods described herein, OUDP can be used for leakage testing.

For OUDP leakage detection, the CMTS (Cable Modem Termination System) directs the CM (cable modem) to transmit an OFDMA signal with certain parameters. In combination with some of the techniques described herein, we realized that the OUDP OFDMA signals can be detected using a matched filter approach, such as by using the cyclic prefix of the OFDMA and pilot pattern for leakage detection.

In the context of the Application, ping includes generation by a CM of any suitable signal into the upstream cable path, including, for example a probing OFDMA signal or an OUDP burst, such as can be used for OUDP leakage detection.

Figure 13:
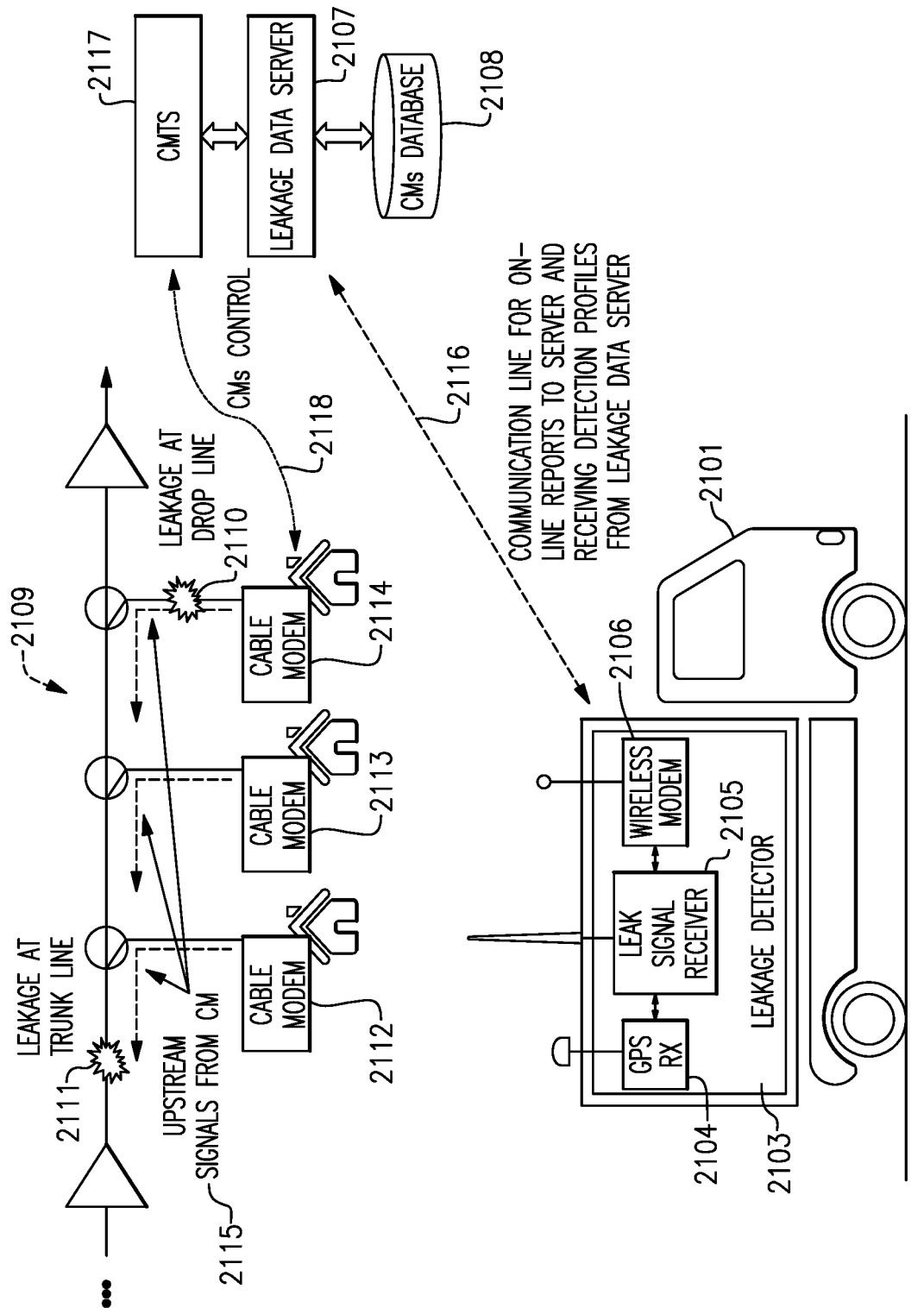
FIG. 13 is a drawing showing a diagram of an exemplary system for monitoring leakage in aeronautical band of high split HFC.

FIG. 13 is a drawing showing a diagram of an exemplary system for monitoring leakage in aeronautical band of high split HFC for both part 2, as well as common to all parts of this Application as a common high level block diagram. Detection vehicle 2101 includes a leakage detector 2103. Leakage detector 2103 includes a GPS receiver 2104, a leak signal receiver 2105, and a wireless modem 2106. Detection vehicle 2101 is in communication via communication line 2116 with leakage data server 2107, and typically via the leakage data server 2107 with the Cable Modem Termination System (CMTS) 2117, and cable modem (CM) database 2108. CMTS 2117 is also operatively coupled by CMs control 2118 to CMs of the cable system 2109 having CMs 2112, 2113, and 2114, etc. Upstream signal 2115 are from the CMs. Exemplary leakage includes leakage at the trunk line 2111, and leakage at a drop line 2110.

Figure 14:
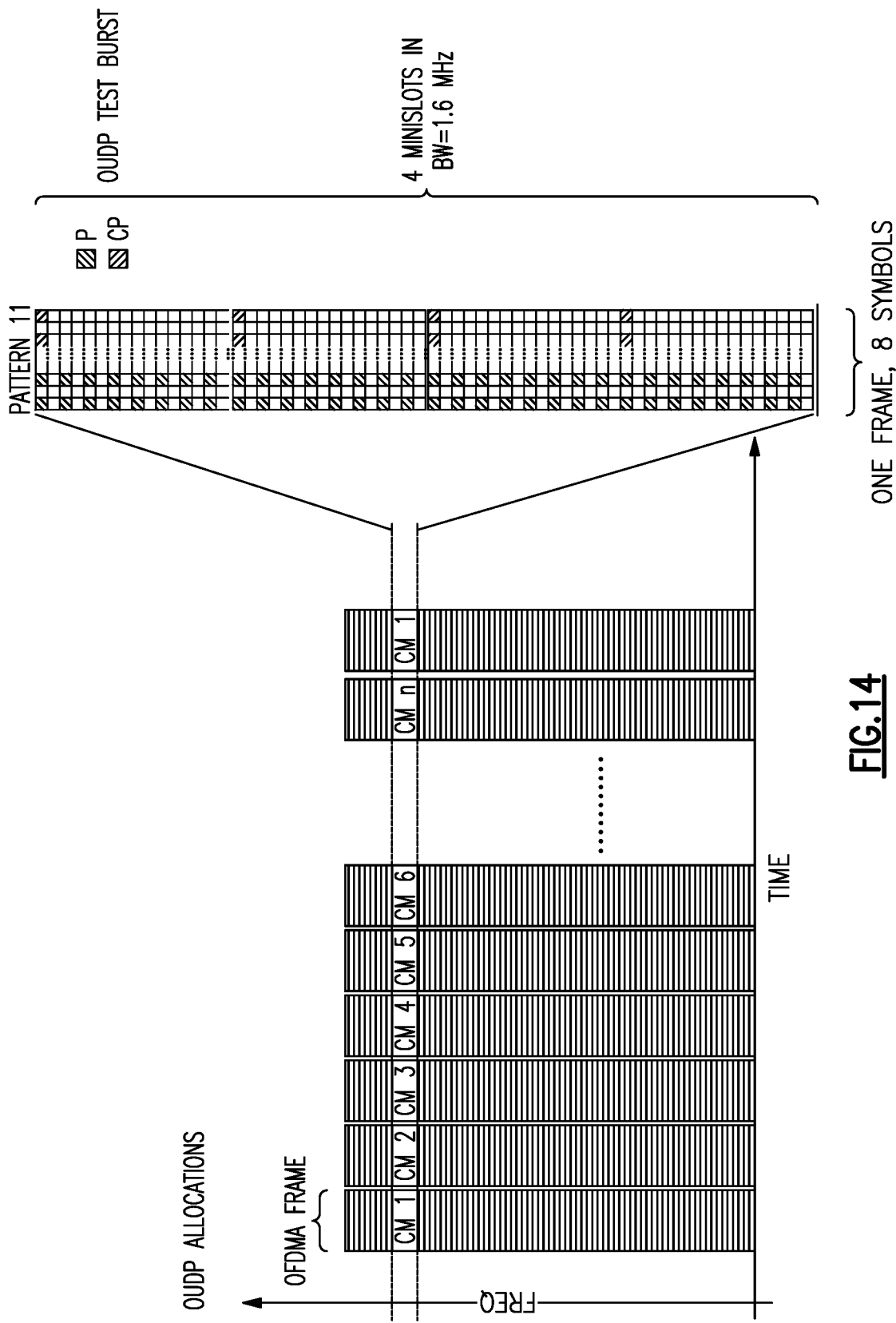
FIG. 14 is a drawing illustrating the concept permanent generation by CM OUDP bursts for monitoring leakage.

FIG. 14 is a drawing illustrating the concept permanent generation by CM OUDP bursts for monitoring leakage.

Figure 15:
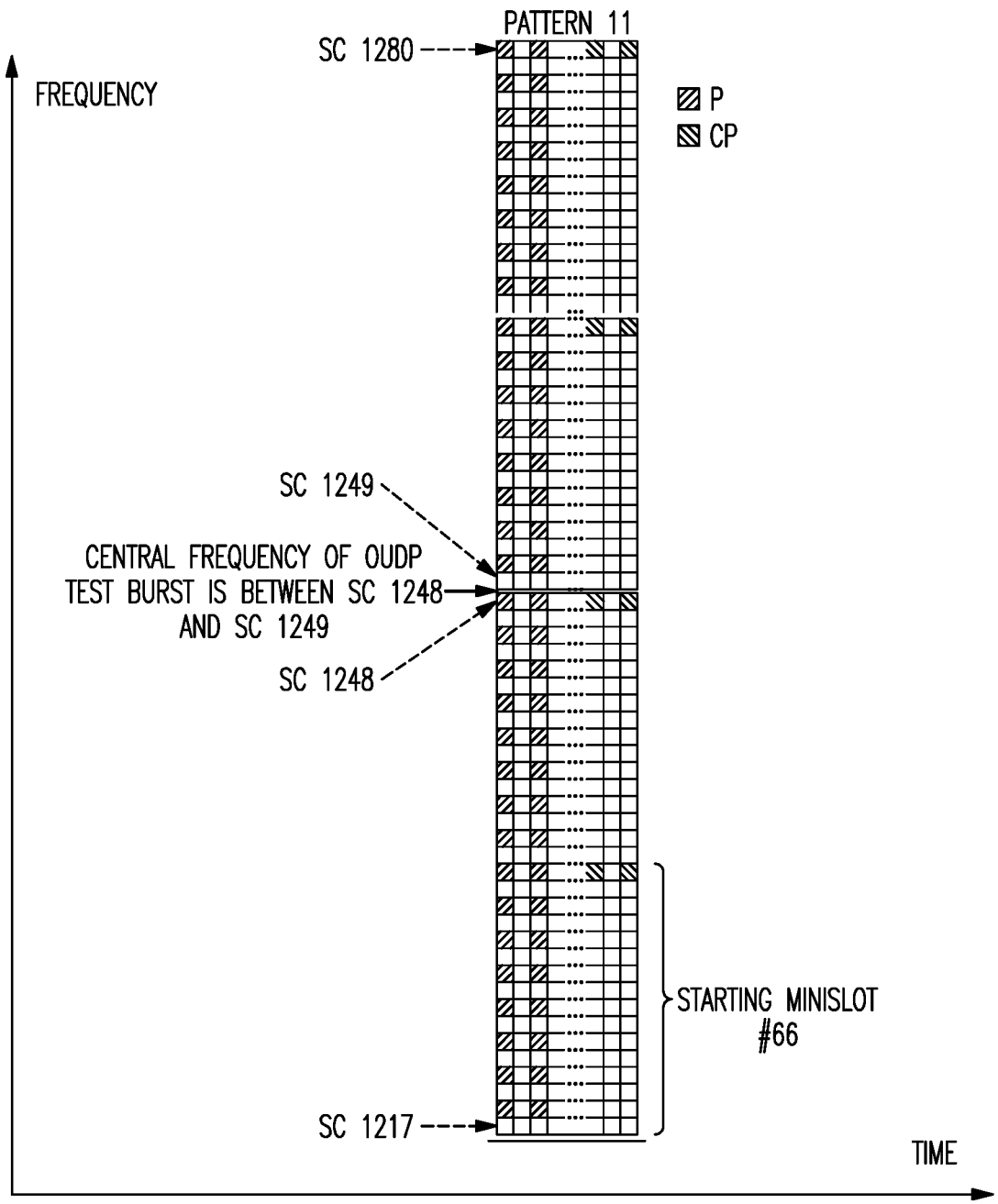
FIG. 15 is a drawing which shows an example of an OUDP burst signal in time-frequency domain for a pilot pattern.

FIG. 15 is a drawing which shows an example of an OUDP burst signal in time-frequency domain for a pilot pattern 11 (a preferable pilot pattern for leak detection due to maximal energy of pilots within the minislot).

Figure 16:
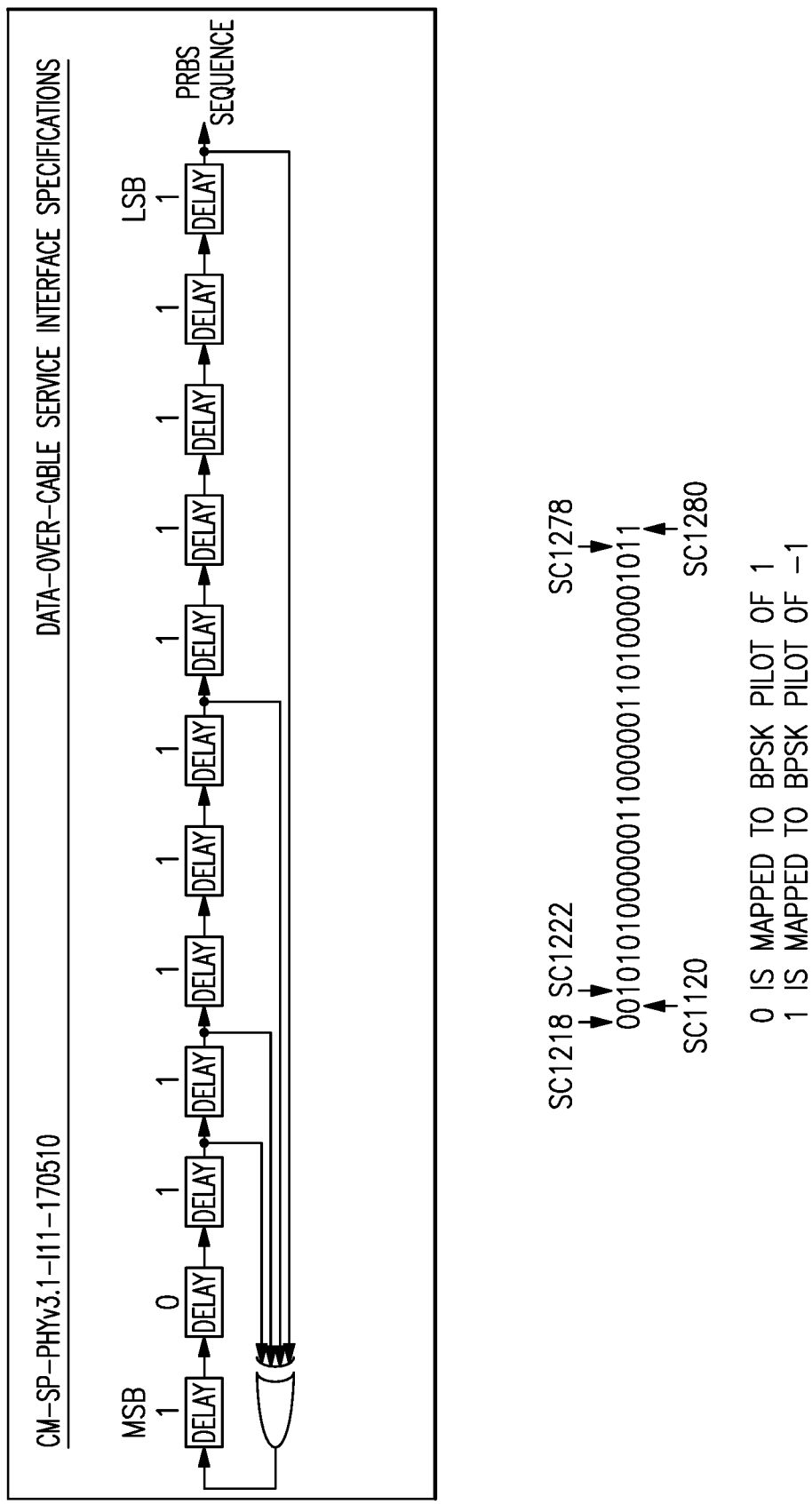
FIG. 16 is a drawing which illustrates binary phase shift keying (BPSK) modulation of OUDP pilots according to DOCSIS 3.1 specs.

FIG. 16 is a drawing which illustrates binary phase shift keying (BPSK) modulation of OUDP pilots according to DOCSIS 3.1 specs.

Figure 17:
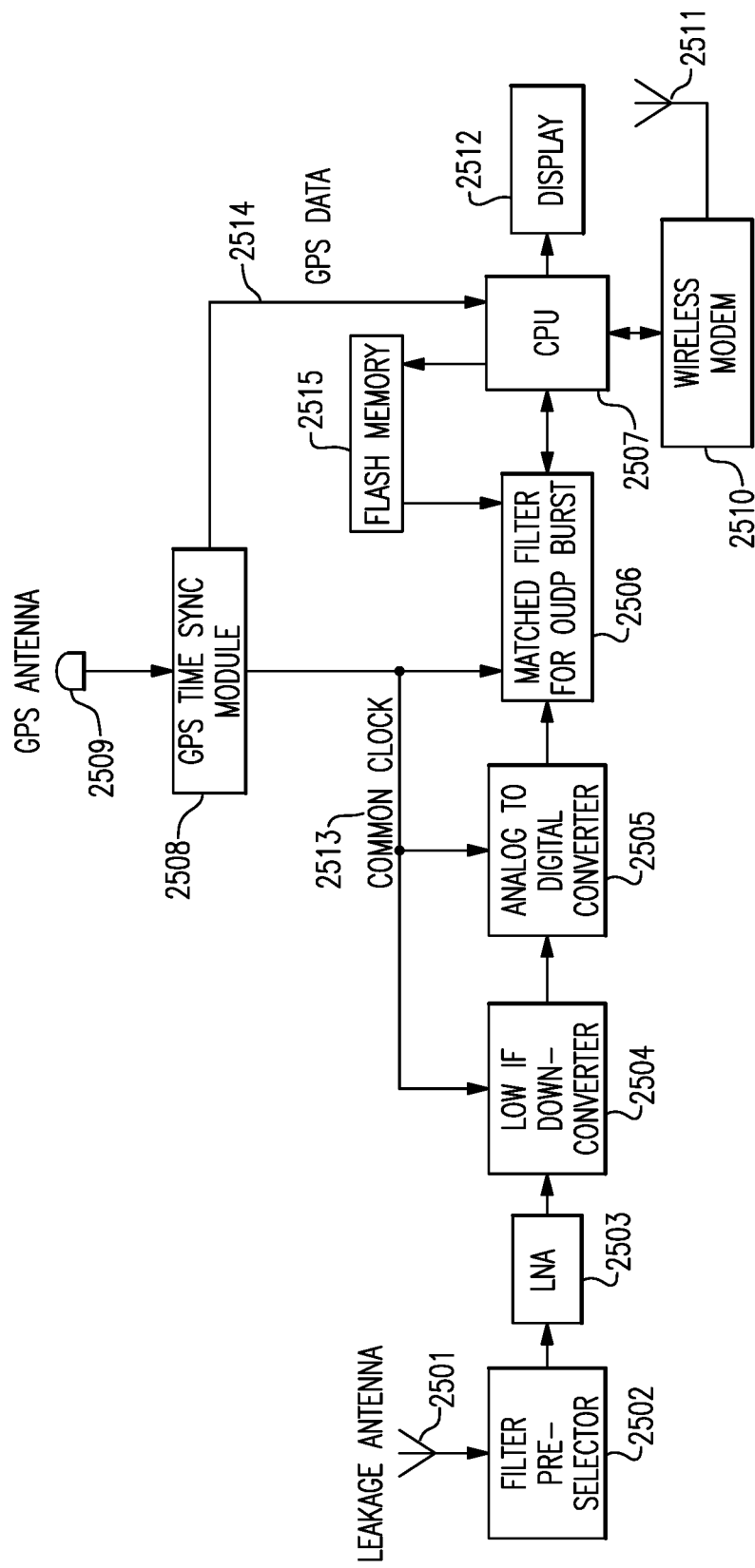
FIG. 17 is a drawing showing a block diagram of an OUDP burst detector with an adaptive matched filter and on-line receiving of coefficients of a matched filter from the leak data server.

FIG. 17 is a drawing showing a block diagram of an OUDP burst detector with an adaptive matched filter and on-line receiving of coefficients of a matched filter from the leak data server (e.g. FIG. 13, leakage data server 2107). Leakage antenna 2501 is electrically coupled to filter preselector 2502. LNA 2503 amplifies signals from the filter pre-selector 2502 for the low IF down-converter 2504. Analog to digital converter (ADC) 2505 is coupled to an output of the low IF down-converter 2504. A matched filter for OUDP burst 2506 is coupled to an output of the ADC 2505. The matched filter for OUDP burst 2506 receives coefficients for a current detection profile from memory 2515 (e.g. a flash memory). Matched filter for OUDP burst is operatively coupled 2506 Flash memory 2525 and CPU 2507. The digital sections of the low IF down-converter 2504, the ADC 2505, and matched filter for OUDP burst 2506 can be coupled to and run on a common clock 2513, such as can be provided by a GPS time sync module 2508, which GPS time sync module 2508 can also provide GPS data to CPU 2507. GPS time sync module 2508 receives GPS satellite signals via GPS antenna 2509. Display 2512 can show both settings of the leakage detector as well as results computed by a processor of CPU 2507. The leakage detector according to FIG. 17 can be wirelessly coupled via wireless modem 2510 and antenna 2511, such as to provide the communications line 2116 of FIG. 13.

Figure 18:
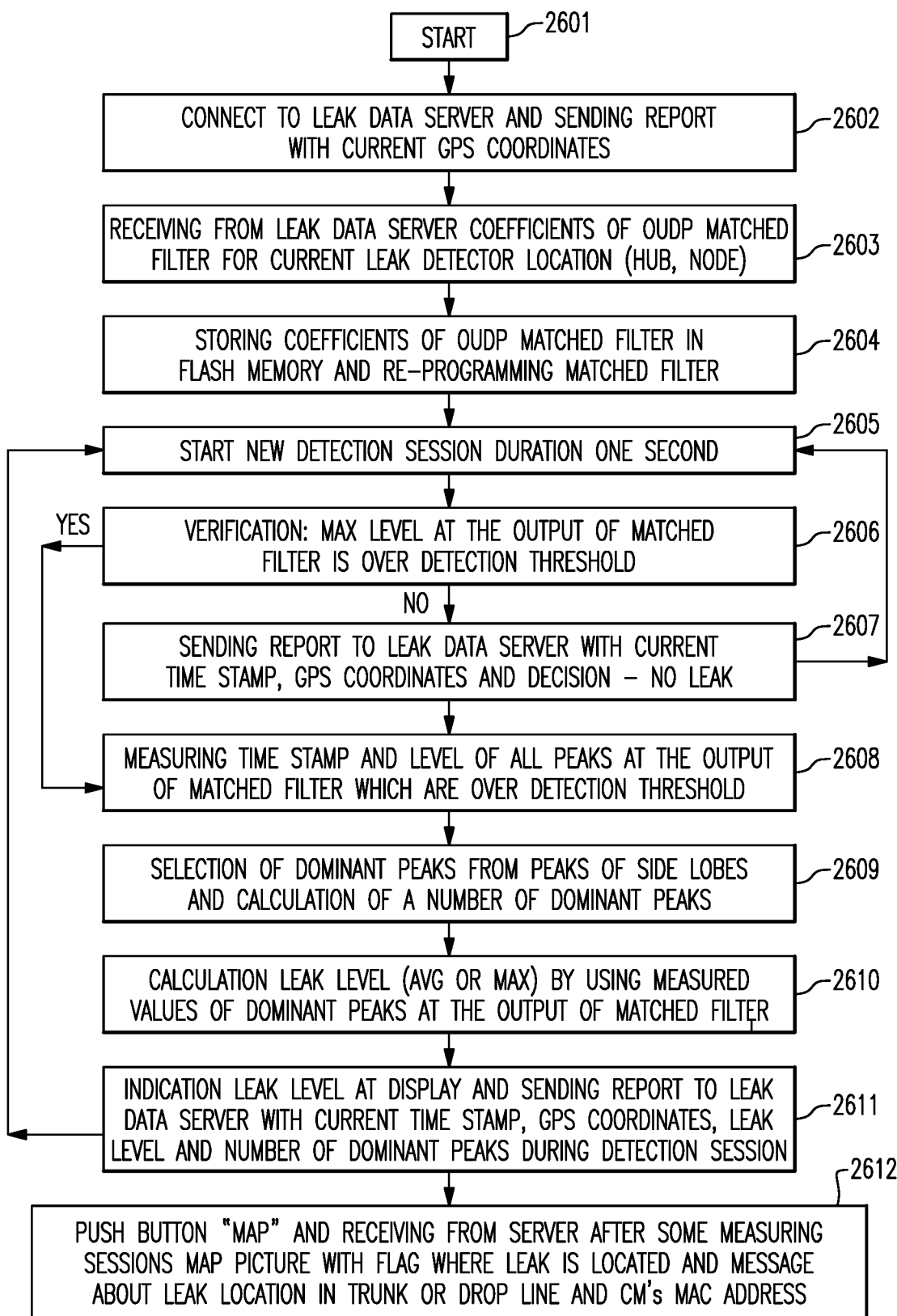
FIG. 18 is a is flow chart showing an exemplary operation of an OUDP leak detector according to the Application.

FIG. 18 is a flow chart showing an exemplary operation of an OUDP leak detector according to the Application. The exemplary steps include following start 2601, Connect to leak data server and sending report with current GPS coordinates 2602, Receiving from Leak data server coefficients of OUDP matched filter for current leak detector location (hub, node) 2603, Storing coefficients of OUDP matched filter in flash memory and re-programming matched filter 2604, start new detection session duration one second 2605, Verification: Max level at the output of matched filter is over detection threshold? 2606, No—Sending report to leak data server with current time stamp—GPS coordinates and decision—No leak 2607, Yes—Measuring time stamp and level of all peaks at the output of matched filter which are over detection threshold 2608, Selection of dominant peaks from peaks of side lobes and calculation of a number of dominant peaks 2609, Calculation leak level (AVG or Max) by using measured values of dominant peaks at the output of matched filter 2610, Indication leak level at display and sending report to leak data server with current time stamp, GPS coordinates, leak level and number of dominant peaks during detection session 2611, loop to 2605, otherwise, Push button "Map" and receiving from server after some measuring sessions map picture with flag where leak is located and message about leak location in trunk or drop line and CM's MAC address 2612.

Note that the method of FIG. 18 can also be performed without a GPS receiver, or without use of GPS data, where, for example, physical locations are determined by an identifier of any particular hardware box, such as, for example, a MAC address of a CM.

Note that, at steps 2608 and 2609 a procedure of selection dominant peaks of cross-correlation process function can be added at the output of matched filter. This process algorithm can define the number of OUDP burst detected during a detection session of, for example, 1 second, and then makes a decision at the server if a detected leak signal is coming from a trunk line (e.g. where there are multiple peaks from many CMs), or from a drop line (e.g. single or two peaks from one CM).

Figure 19:
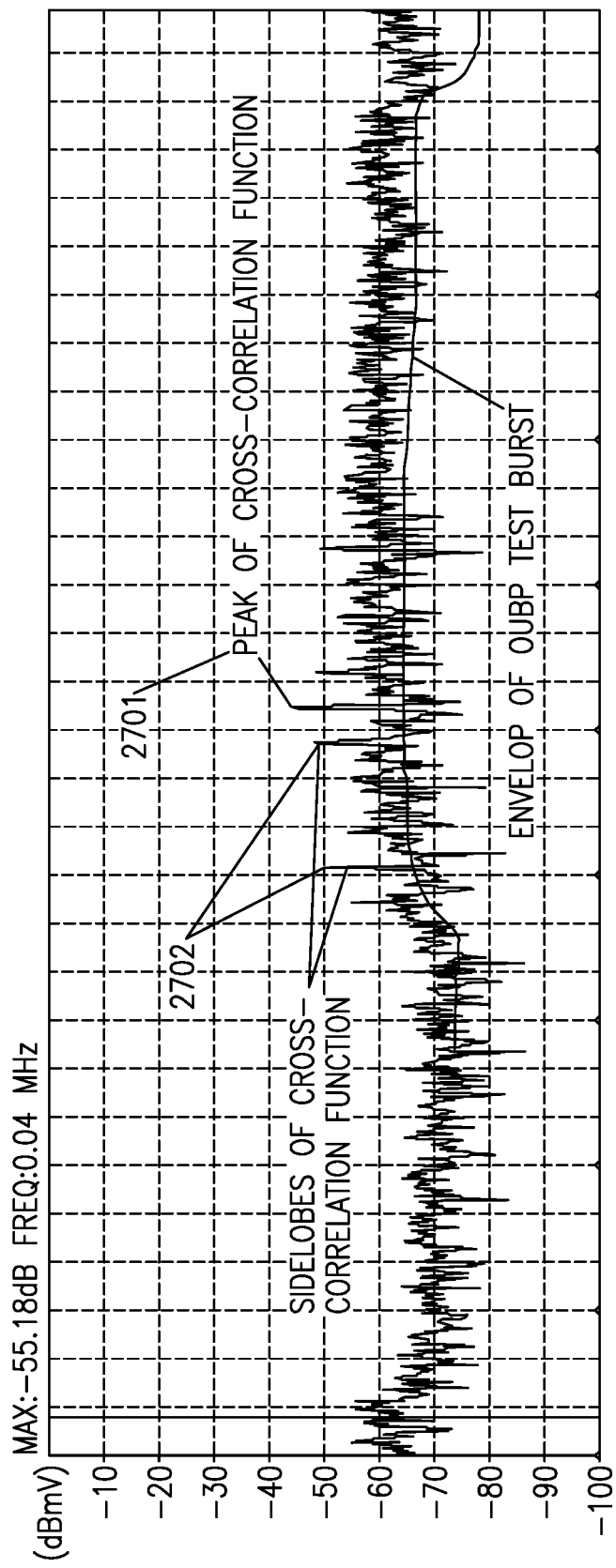
FIG. 19 is a drawing showing a graph which illustrates an exemplary actual correlation process at the output of OUDP matched filter for a pilot pattern.

FIG. 19 is a drawing showing a graph which illustrates an exemplary actual correlation process function at the output of OUDP matched filter for a pilot pattern 11. An important feature of this process function is that besides the dominant peak, peak of cross-correlation process function 2701, there are many lower level side lobes peaks, side lobes of cross-correlation process function 2702 due to the nature of the pilot pattern. The side lobes peaks can be over the detection threshold and a selection process can be used for a correct calculation of a proper number of dominant peaks (i.e. the number of CMs).

Figure 20:
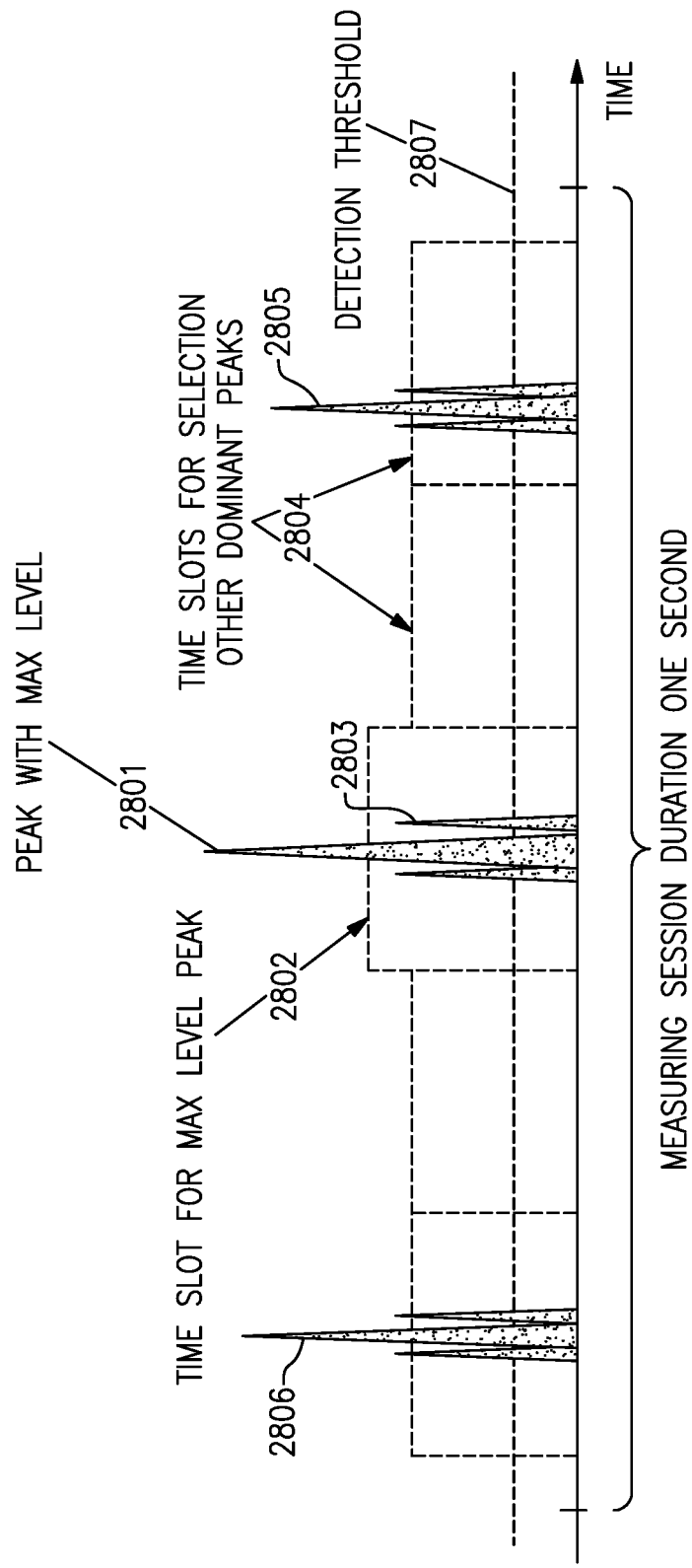
FIG. 20 is a graph which illustrates the concept of a process algorithm for the selection of dominant peaks.

FIG. 20 is a graph which illustrates the concept of a process algorithm for the selection of dominant peaks. A detection threshold 2807 provides a starting point for the detection of a max level peak and for defining from this peak, time slots where there could be other dominant peaks. The duration of the above time slot is equal to the duration of the OUDP burst signal. Over the exemplary 1 second measuring duration, there are time slots 2804. A peak 2806 in a first time slot is followed in a third time slot by a peak with max level 2801 in a in a time slot of max level peak 2802, with side lobes 2803. In a fifth time slot of the time slots for other dominant peaks 2804, is peak 2805. The exemplary detection threshold is shown as detection threshold 2807.

Figure 21A:
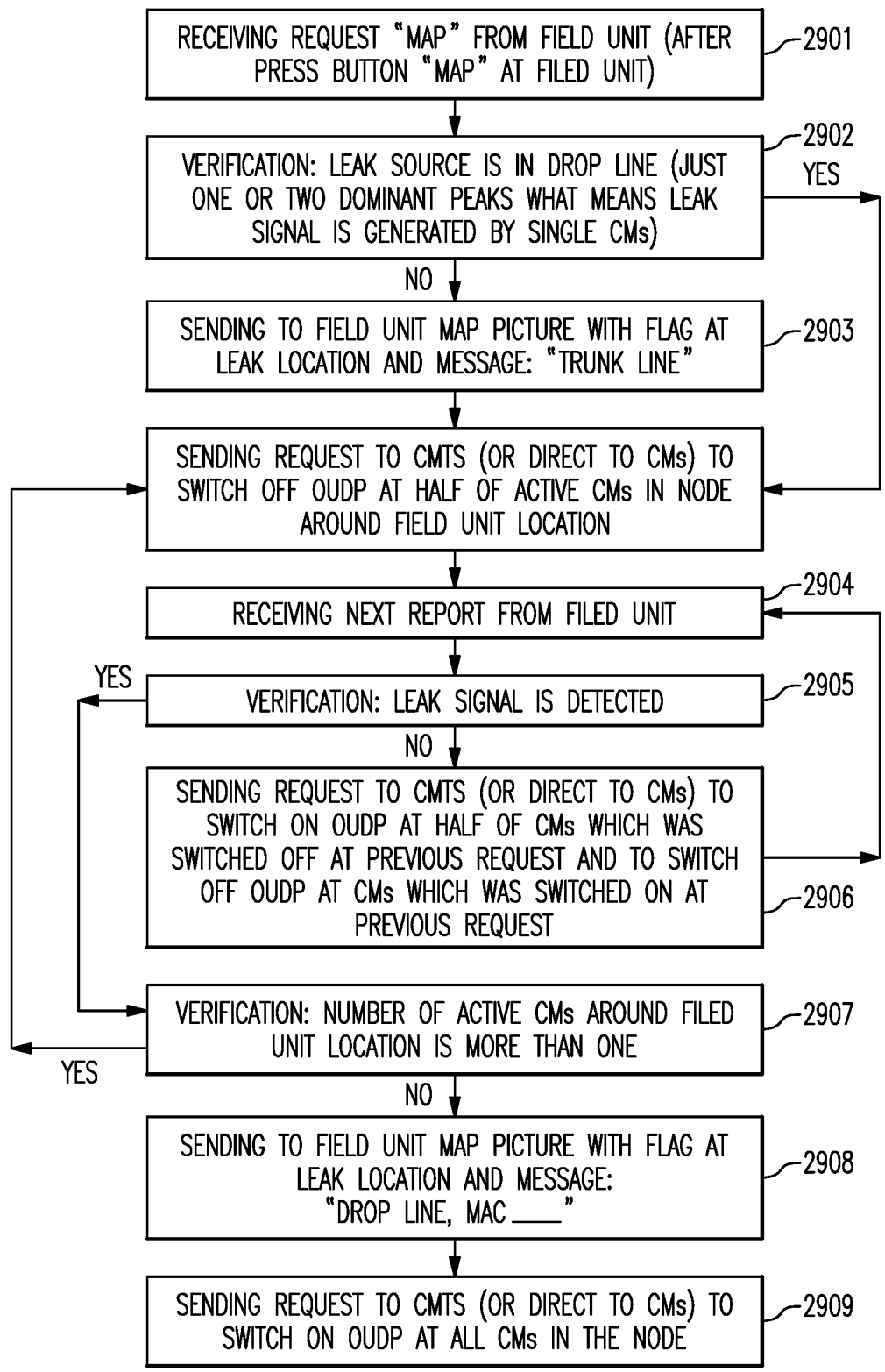
FIG. 21A is a drawing showing a flow chart of an exemplary leak data server operation after an operator presses the "Map" button at a field unit.

FIG. 21A is a drawing showing a flow chart of an exemplary leak data server operation after an operator presses the "Map" button (FIG. 21A) at a field unit.

The exemplary steps include: Receiving a request "Map" from field unit (after press button "Map" at filed unit) 2901, Verification: Leak source is in drop line (just one or two dominant peaks what means leak signal is generated by single CMs)? 2902, No—Sending to field unit map picture with flag at leak location and message: "Trunk line" 2903, Yes—Sending request to CMTS (or direct to CMs) to switch off OUDP at half of active CMs in node around field unit location 2913, Receiving next report from filed unit 2904, Verification: Leak signal is detected? 2905, No—Sending request to CMTS (or direct to CMs) to switch on OUDP at half of CMs which was switched off at previous request and to switch off OUDP at CMs which was switched on at previous request 2906 and loop to 2904, Yes—Verification: Number of active CMs around filed unit location is more than one? 2907, Yes—loop to 2913, No—Sending to field unit map picture with flag at leak location and message: "Drop line, MAC" 2908, Sending request to CMTS (or direct to CMs) to switch on OUDP at all CMs in the node 2909.

This process algorithm can define if the leak comes from a trunk line or a drop line and the Mac address of the associated CM.

Figure 21B:
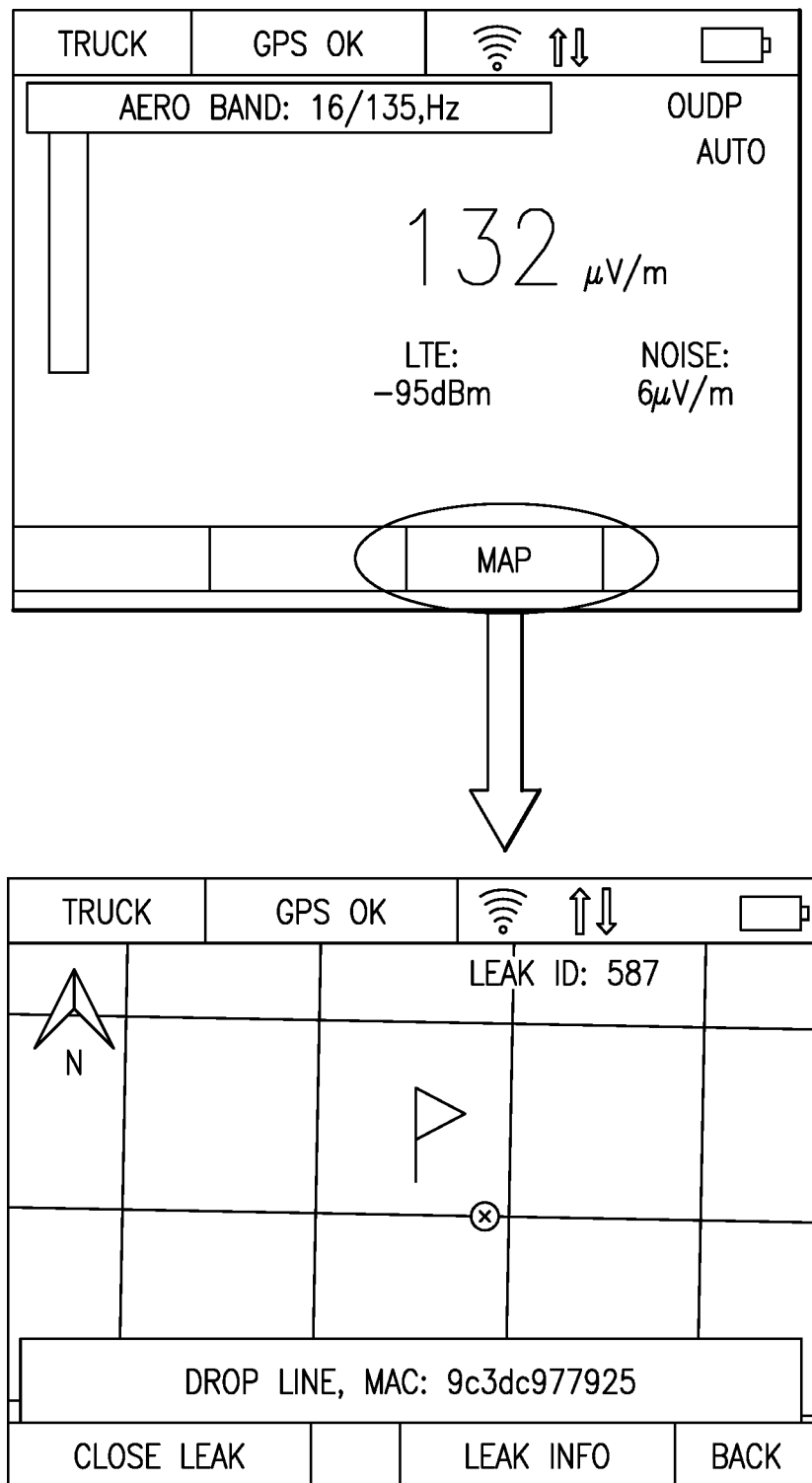
FIG. 21B is a drawing showing exemplary display screens of an exemplary OUDP detector with "Map" mode with detection MAC address.

FIG. 21B is a drawing showing exemplary display screens of an exemplary OUDP detector with "Map" mode with detection MAC address.

OUDP burst duration—As noted at the beginning of Part 2, we realized that combined with some of the new methods described herein, OUDP can also be used for leakage testing. The same previously described concepts as illustrated by FIG. 5, FIG. 6, FIG. 11, and FIG. 12 are now applied to OUDP burst duration for leak validation In combination with some of the techniques described herein, we realized that the OUDP and OFDMA signals can be detected using an energy burst detector. This method is described in Part 1 of the application for ATDMA bursts. In this case of OUDP bursts, burst durations are measured, and then the measured burst durations are compared with expected values of burst durations. The system and method of detection and validation OUDP burst includes, measuring duration of detected bursts, collecting histogram of burst durations during measuring session and then compare the histogram of burst durations with expected durations of OUDP bursts.

Auto-correlation cyclic prefix of OUDP bursts—As noted at the beginning of Part 2, we realized that combined with some of the new methods described herein, OUDP can be used for leakage testing. The same previously described concepts as illustrated by FIG. 9, FIG. 10, and FIG. 11 are now applied to Auto-correlation cyclic prefix of OUDP bursts for leak validation.

Another system and method of detection OUDP can use an auto-correlation of cyclic prefix of OUDP bursts (OUDP bursts are similar to OFDMA bursts). This method for OUDP bursts is the same as is described hereinabove in Part 1 of the Application for OFDMA bursts. One system and method of detection of OUDP bursts includes auto-correlating cyclic prefixes of OFDMA symbols within OUDP bursts, and then accumulating coherent responses of the auto-correlation functions from the symbols within the OUDP bursts.

Part 3 CW Signals

A challenge now exists with some of the new architectures being considered, specifically high-split systems where the upstream spectrum covers a frequency bandwidth up to 204 MHz as well as Full Duplex systems where the downstream and upstream frequency bands overlap in the aeronautical band. For both of these new architectures, transmitted carriers within the aeronautical band which is mandated by the FCC to be monitored for signal leakage, are now no longer generated from the headend or from the node in the forward direction—but are alternatively now generated from equipment in the customer premises in the form of cable modems, and are transmitted from the customer premises to the headend utilizing return path frequencies. As such, the status quo techniques used to monitor for signal leakage are no longer practical to use.

Figure 22:
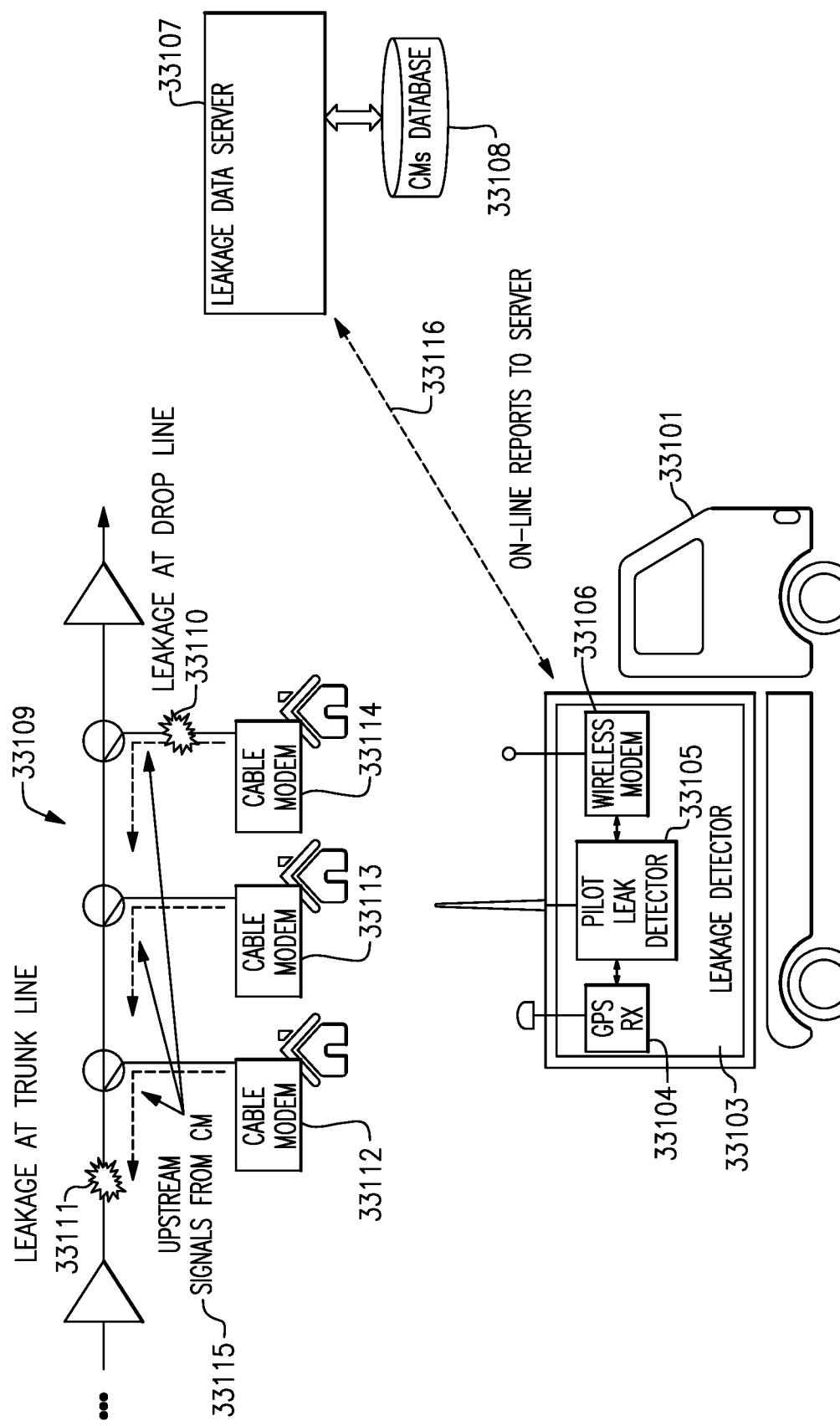
FIG. 22 is a drawing showing a block diagram of an exemplary embodiment of system for monitoring leakage at aeronautical band of high split HFC network according to the present application, part 3.

An exemplary embodiment of system for monitoring leakage at aeronautical band of high split HFC network according to the present application is illustrated in the schematic block diagram of FIG. 22. As an example, this embodiment includes field leakage detector 33114 installed on truck 33101 and leakage data server 33107 with database of cable modems (CM) in HFC network. Field leakage detector 33103 includes pilot leak detector 33105, GPS receiver 33104, and wireless modem 33106.

The system of FIG. 22 works as follows: As was noted above at high split HFC network 109 aeronautical band 108-137 MHz is covered by upstream bandwidth 5-204 MHz, so, leakage at drop line 33110 and trunk line 33111 will be produced from upstream signals 33115 generated by cable modems (CM) 33112, 33113 and 33114. Upstream signal 33115 at high split HFC network in aeronautical band 108-137 MHz is OFDMA burst signal. Monitoring leakage from this signal is a challenge because this is a spread spectrum random signal and for this type of noise signal, it is not easy to provide good sensitivity and validation of detection.

The next problem of monitoring leakage from OFDMA upstream signal is that TX sessions of CMs 33112 . . . 33114 are controlled by CMTS according on many different criteria. So, there is no way to guarantee that CMs 33112 . . . 33114 will generate an OFDMA upstream signal in aeronautical band exactly when the truck 33101 with leak detector 33103 will be at close proximity to leak sources 33110 and 33111.

To overcome above issues with detection random OFDMA signal according to present application, each CM 33112 . . . 33114 in the HFC network 33109 permanently generates a narrow bandwidth pilot signal for monitoring leakage. The pilot signal is placed into an exclusion bandwidth of the upstream OFDMA spectrum within the aeronautical band 108-137 MHz. Also, each CM within one node has a specific frequency offset of a pilot signal to prevent cumulative effect of pilots from different CMs in trunk line (at location of leak source 33111). Specifications of the pilot signal generated by CMs 33112 . . . 33114 are described in detail hereinbelow.

Exemplary leakage detector 33103 detects a leak from the pilot signals generated by the CMs 33112 . . . 33114 and, each second send reports 33116 via wireless modem 106 to the leakage data server 107. The report includes data about the level of detected leaks, exact frequencies of detected pilot signals, current GPS coordinates of truck 33101, and GPS time stamps. Leakage data server 33107 analyses the GPS coordinates and defines an HFC network node where truck 33101 is currently located. Then server 33107 analyses the frequencies of the detected pilots and compares it with CM's settings at database 33108. This analysis allows server 33107 to define MAC addresses of CMs from which the pilot signal was detected. This information is then used by server 33107 to define the exact location of the leak source by using an electronic map of the HFC network and physical addresses of MACs in database 33108. For example, if detected pilots correspond to a single CM or to a few CMs with the same physical address, then the probable leak location is at drop line (leak source 33110) at the corresponding physical address. If detected pilots correspond to multiple CMs with different physical addresses, then the probable location of leak source is in a trunk line (leak 33111 in FIG. 22) at the nearest proximity to physical address of CM which is more close to CMTS (CM 33112 in FIG. 22).

Note that while a GPS element on the truck can be useful, the GPS is not required. For example, in a system without GPS, or not using GPS, a physical address can be determined directly from a MAC address of the CM.

Also, for example in the context of an OUDP based system, the OUDP format may vary and/or there may be different OUDP configurations for different geographical areas which would necessitate different OUDP matched filter coefficients. In such cases, a GPS equipped leakage detection vehicle can automatically load the correct OUDP settings in any particular GPS location (e.g. for any given hub's profile).

However, where there is only one profile, a vehicle can perform leakage detection methods of the application either without a GPS or without GPS information, where physical locations can be established by know locations of identifiable hardware, such as, for example, a known physical address/location of a CM as determined by its MAC address or other suitable physical box identifier.

Figure 23:
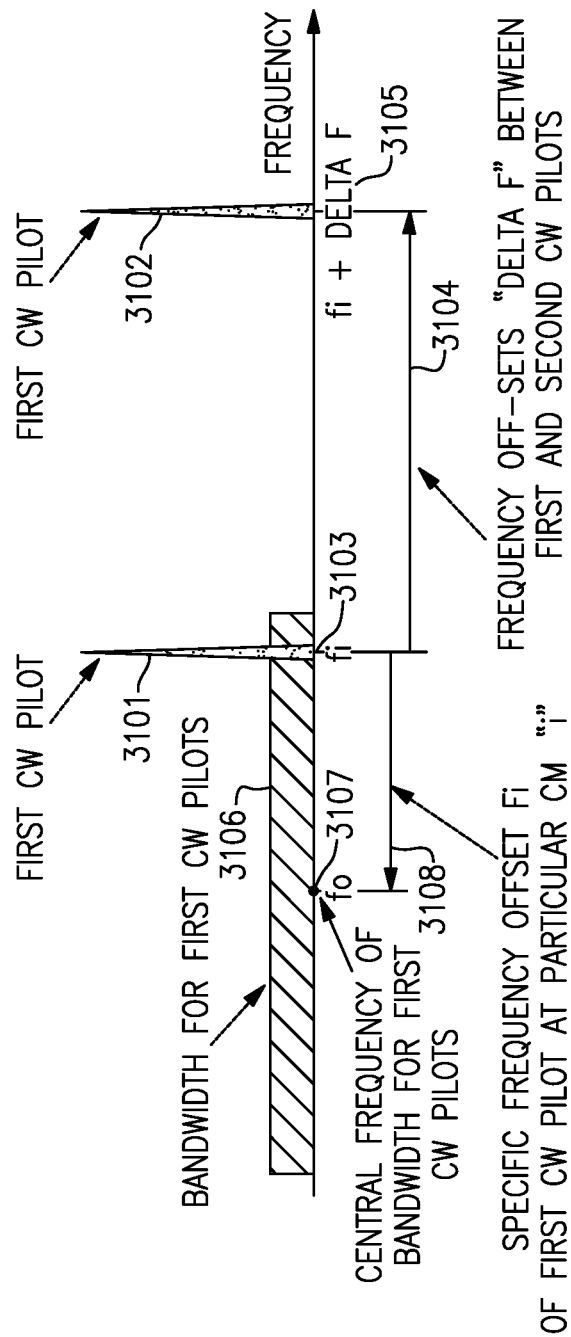
FIG. 23 is a drawing showing the structure of an exemplary pilot signal generated by a CM.

The structure of an exemplary pilot signal generated by a CM is shown in FIG. 23. The pilot signal includes two CW pilot carriers 3101 and 3102. The first CW pilot 3101 in FIG. 23 has central frequency fi (3103). This frequency fi is specific for particular CM "i" in the node and all CMs within one node has different frequencies fi. All frequencies fi are located within bandwidth 3106 with central frequency $f_0$ 3107. So, each frequency fi has specific frequency offset Fi 3108 from frequency $f_0$. This offset Fi 3108 is installed at CM by CMTS and then stored at CM's database 33108 (FIG. 22). In other words, each MAC address of CM in database 33108 is associated as with physical address of CM and with frequency offset Fi too. Thus, measuring the frequency offset Fi at the leak detector 33103 allows to recognize MAC address of CM and then define physical address of CM from which leak signal was generated. This information, as was noted above, allows to locate leak source 33110 and 33111 in the network 109 (see FIG. 1).

The frequency offset between first CW pilots 3101 and second CW pilot 3102 is "Delta F" (3104), so, the second CW pilot is located at frequency fi+Delta (3105). This frequency offset "Delta F" is generated in CM very precisely with accuracy less than 1 Hz what allows then at leak detector side to use measured frequency offset for leak validation. It should be noted, that generation of CW pilots is standard operation mode in modern DOCSIS 3.1 CMs because this mode is also used for sounding interfering groups for full duplex.

In the case of a location leak source in drop line (see leak 33110 in FIG. 22) and single CM in the home the leak signal will look as shown in FIG. 23.

Figure 24:
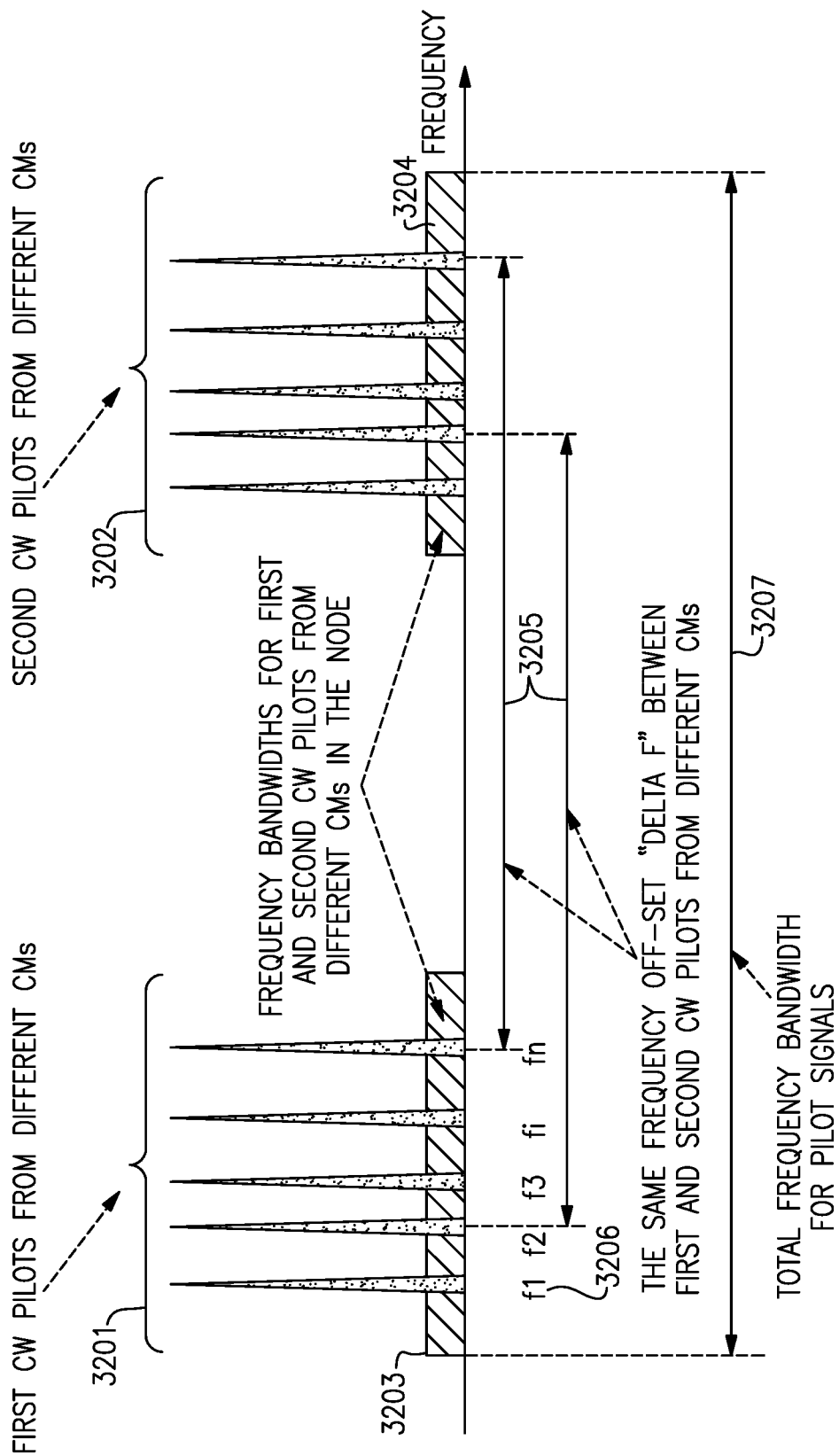
FIG. 24 is a drawing showing an exemplary combination of pilots from different CMs.

However, if the leak source is located in a trunk line (e.g. leak 33111 in FIG. 22) the leak signal will be combination of pilots from different CMs. This combined signal is illustrated in FIG. 24. The first CW pilots 3201 from different CMs are located within bandwidth 3203 and the second CW pilots 3202 are located within bandwidth 3204. The first CW pilots 3201 has specific central frequencies 3206 (f1, f2, f3, . . . fi, . . . fn), but the frequency offset "Delta F" 3205 between the first and second CW pilots is the same for different CMs. Thus, fixed frequency offset "Delta F" at each CM allows to validate leak signal even in case of combining pilot signal in trunk line. From the other side using specific frequency offset Fi (FIG. 23) allows to split CW pilots 3201 and 3202 in the case of a location leak at trunk line and combining pilots from different CMs. For good separation CW pilots 3201 and 3202 in leak detector the minimal offset between adjacent CWs must be at least in ten times more than frequency resolution of the leak detector. Most modern leak detectors use an FFT spectrum analyzer for detection of CW pilots. The potential frequency resolution of FFT spectrum analyzer first of all depends on measuring time. However, measuring time during patrolling leak on truck is limited one or even half of second. It means that potential frequency resolution in case of measuring time equals to half second will be around few Hz. Thus, the reasonable minimal step of frequency offset Fi (FIG. 23, 24) should be around tens Hz, for example, 30 . . . 50 Hz.

The bandwidths 3203 and 3204 used for the first and the second CW pilots depends on the maximal number of CMs in the node. For example, in the case of 250 CMs in a node (more than the typical value) the bandwidth 3203 and 3204 used can be calculated as 50 Hz×250=12.5 kHz.

The total bandwidth 3207 for placing all first 3201 and second 3202 CW pilots depends from frequency offset "Delta F". Offset "Delta F" 3205 should be more than bandwidth 3203 to prevent overlapping bandwidths 3203 and 3204. An example is to select guard interval between bandwidths 3203 and 3204 as 12.5 kHz where the frequency offset "Delta F" will be 25 kHz and the total bandwidth 3207 will be 37.5 kHz.

Figure 25:
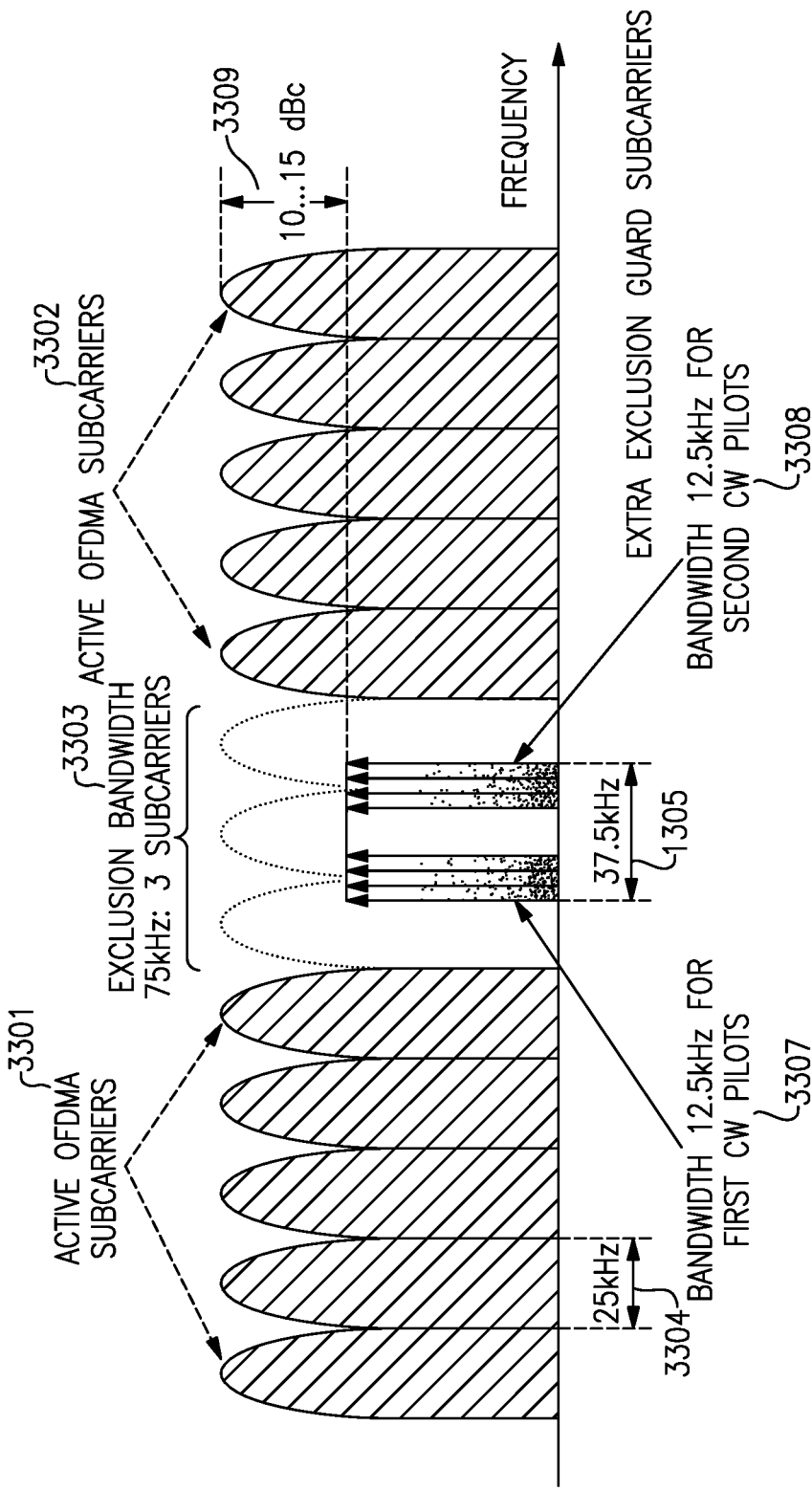
FIG. 25 is a drawing showing an exemplary pilot signal placed into an exclusion bandwidth of an upstream OFDMA spectrum.

In FIG. 25 is shown example of placing pilot signal in FIG. 24 into an exclusion bandwidth of upstream OFDMA spectrum for scenario 4 k FFT mode. In this case OFDMA subcarrier spacing is 25 kHz (3304). The total bandwidth 37.5 kHz (3305) of pilot signal is placed into exclusion bandwidth 75 kHz (3303). This exclusion bandwidth 3303 includes 3 excluded subcarriers and located between active subcarriers 3301, 3302 and within aeronautical band 108-137 MHz. The frequency bandwidth 3307 and 3308 for first and second CW pilots are located symmetrical from both sides of central (second) excluded subcarrier to prevent interfering with active subcarriers 3301 and 3302 at CMTS Rx side. Additionally, for preventing interfering the level of CW pilots is installed at CMs on 10 . . . 15 dBc below (3309) of active OFDMA subcarriers 3301 and 3302.

Figure 26:
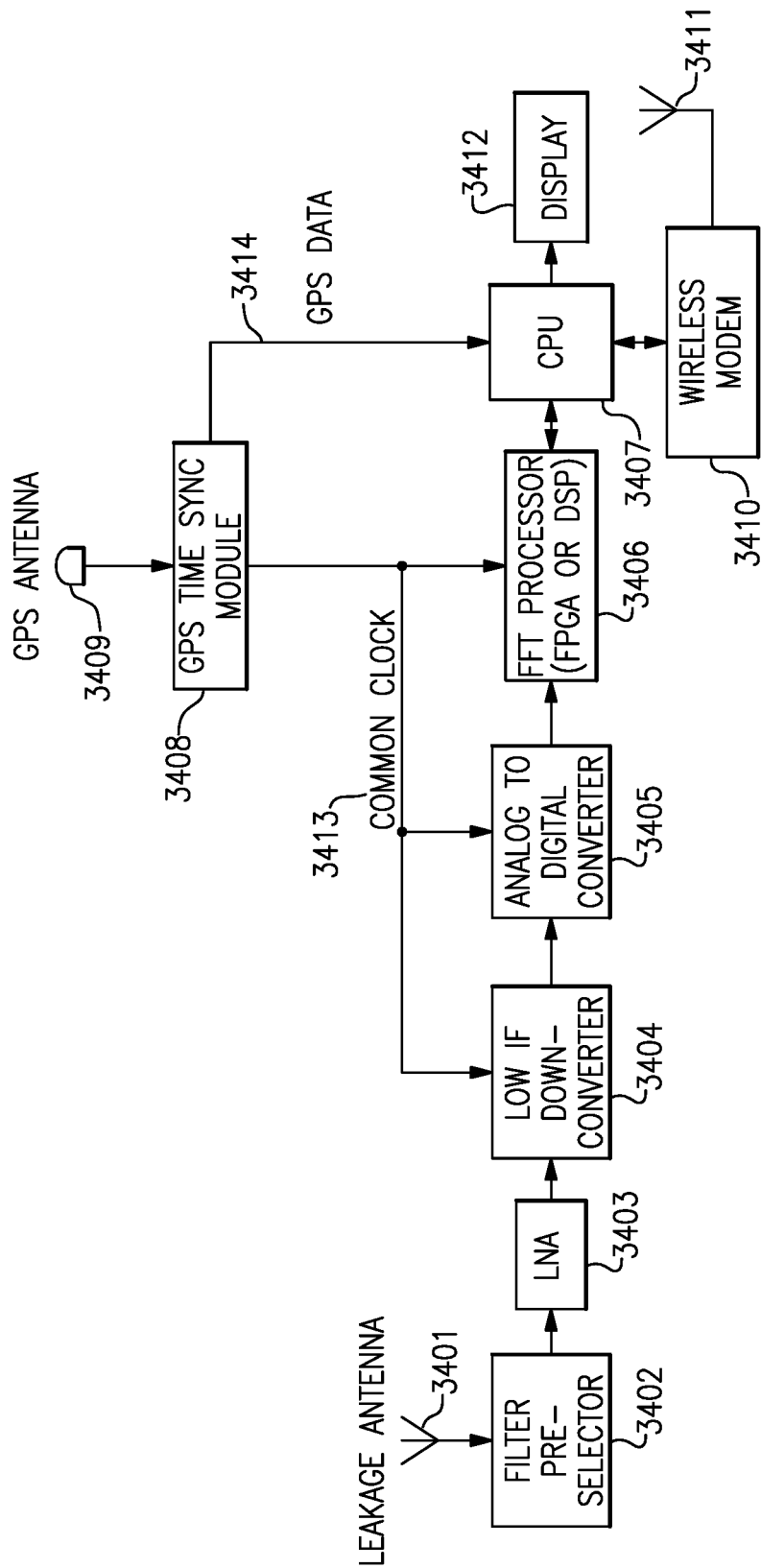
FIG. 26 is a drawing showing a block diagram of an exemplary leakage detector suitable to perform new CW methods of the Application.

FIG. 26 is a drawing showing a block diagram of an exemplary leakage detector 33103 (FIG. 22) suitable to perform the new methods of part 3 of the Application.

A method of monitoring leakage of a high-split HFC network in an aeronautical band includes: generation by cable modems (CM) pilot signal within an upstream OFDMA excluded bandwidth; patrolling near or in pre-defined geographic area with a leak detector including: pilot signal detector; GPS receiver and wireless modem; sending online report from leak detector to leak data server with CM database, said CM database comprising a location of each CM in said pre-defined geographic area, electronic map of HFC networks and parameters of pilot signals; and location physical address of leak source by analysis at leak data server parameters of detected pilot signals from CMs and correlation it with CM's data base.

The pilot signal generated by CM can be a pair of two CW signals with fixed and predefined frequency offset between CW signals.

The first CW signal can have a specific frequency offset of central frequency at each particular CM within HFC network node.

The leak detector can be an FFT spectrum analyzer provided frequency resolution of pilot signals from different CMs and measuring frequency offsets of central frequency of first CW pilot and frequency offset between first and second CW signals.

The validation leak signal in leak detector can be provided by correlation measured frequency offset between first and second CW pilots with predefined frequency offset The report from leak detector to leak data server can include a time stamp, GPS coordinates, detected pilot signal level and frequency offsets of first CW signal for each detected pilot signal.

The pilot signal generated by CM can be a pair of two CW signals with fixed and predefined frequency offset.

The CM database can include a location of each CM in said pre-defined geographic area, electronic map of HFC networks and predefined parameters of pilot signal at each CM;

The location of leak source at can be provided at leak data server by correlation parameters of detected pilot signals with parameters of CMs in database and physical address of CM which is closer to CMTS and which pilot signal is detected is defined as probable location of leak source.

A method of monitoring leakage of a high-split HFC network in an aeronautical band includes: causing two or more cable modems (CM) in a pre-defined geographic area to broadcast pilot signals at different frequencies within an OFDMA exclusion zone; patrolling near or in said pre-defined geographic area with a leak detector, a GPS receiver, and a CM database or a wireless link to a server comprising said CM database, said CM database comprising a location of each CM in said pre-defined geographic area; and on receiving at least one of said broadcast pilot signals, correlating a current GPS location with CMs transmitting at said different frequencies.

Receiving at least one of said broadcast pilot signals can correspond to a leak from an individual cable drop. Receiving a plurality of said broadcast pilot signals can correspond to a leak from a trunk line.

Part 4 CW Signals FDMA

Figure 27:
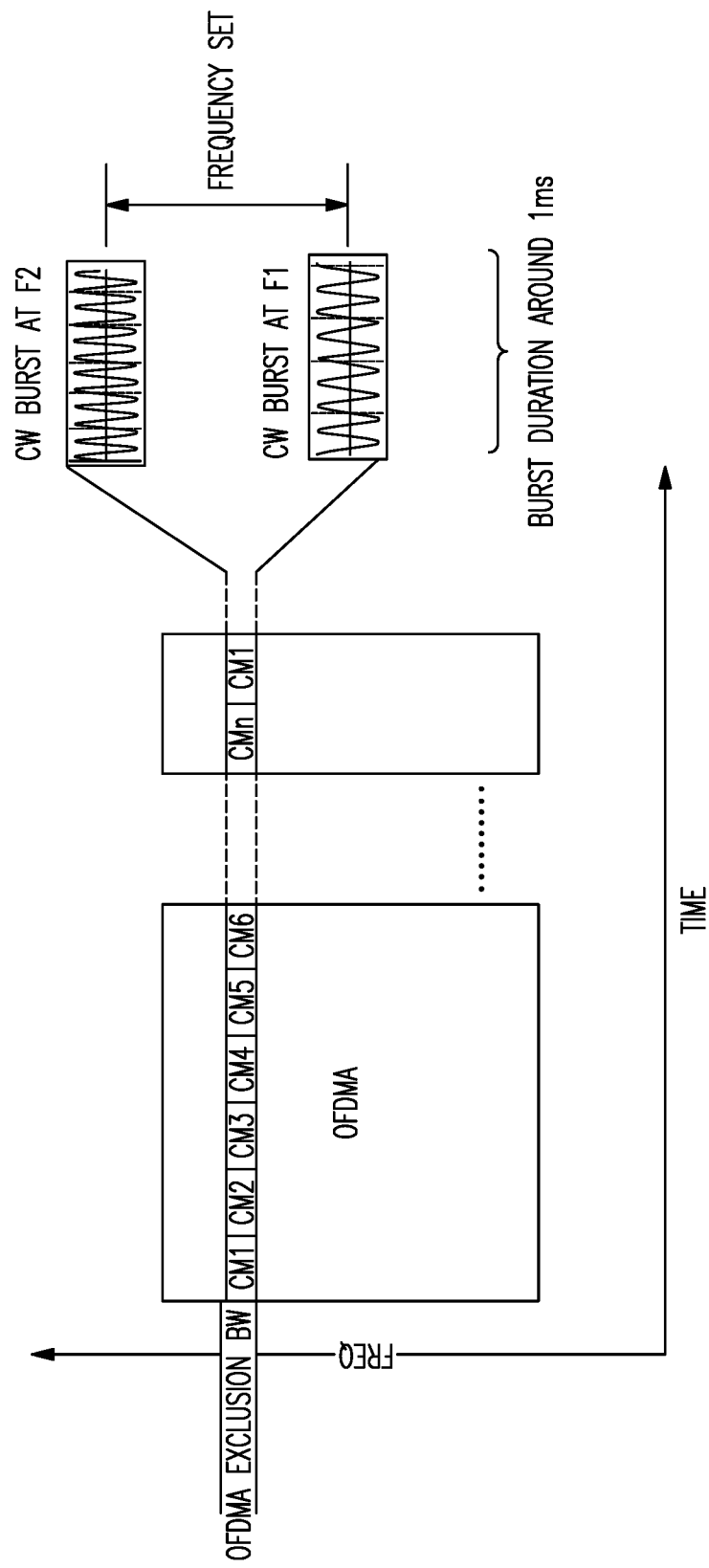
FIG. 27 is a drawing showing a graph of time versus frequency for exemplary OFDMA bursts at F1 and F2.
Figure 28:
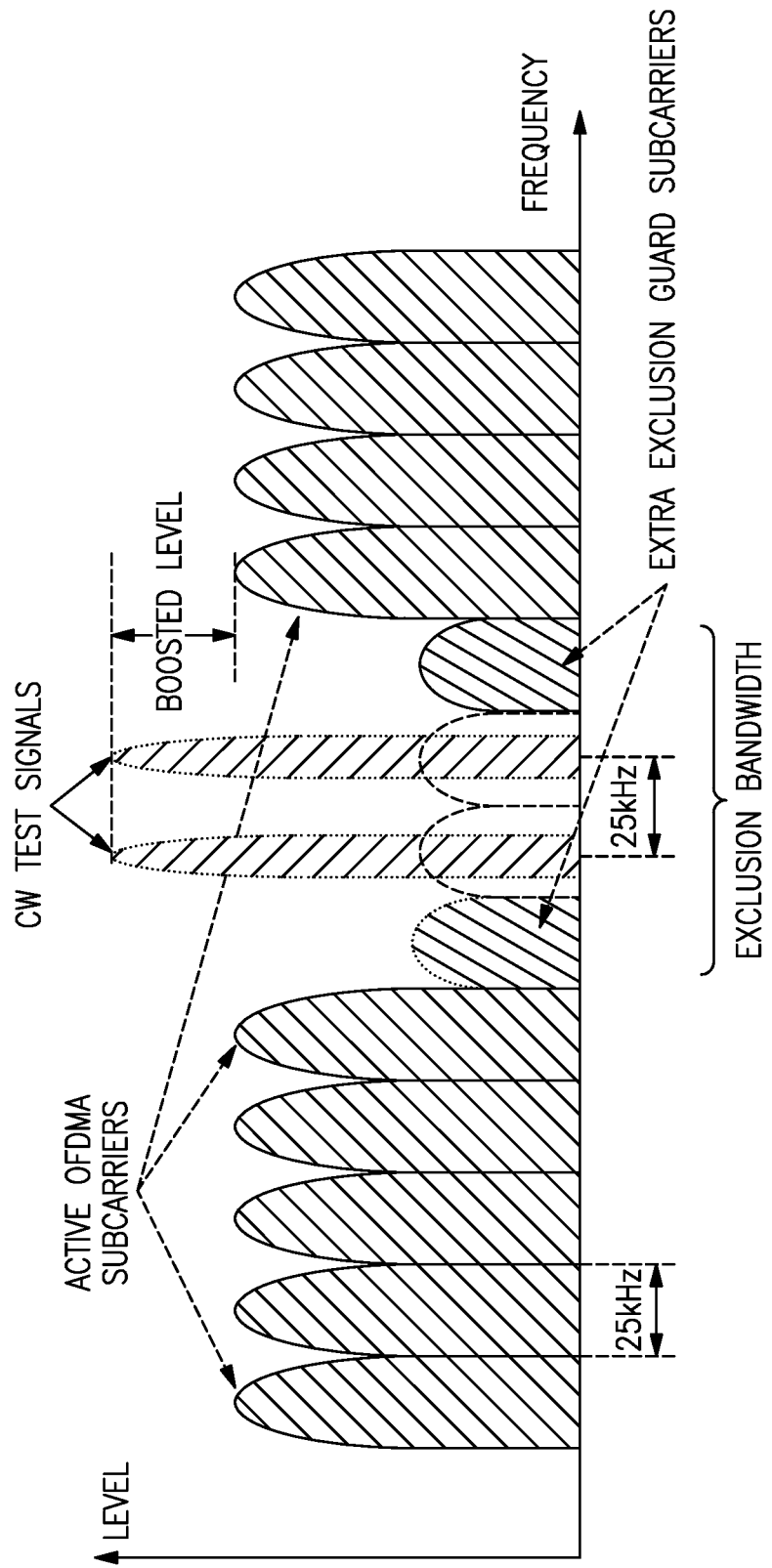
FIG. 28 is a drawing showing exemplary CW test signal in the exclusion bandwidth adjacent to active OFDMA subcarriers.

FIG. 27 and FIG. 28 show an exemplary CW-TDMA mode. The CW-TDMA mode can be viewed as a combination of the OUDP-TDMA and CW modes. The leakage detector of FIG. 26 can be used to perform leakage detection in the CW-TDMA mode. FIG. 27 is a drawing showing a graph of time versus frequency for exemplary OFDMA bursts at F1 and F2. FIG. 28 is a drawing showing exemplary CW test signal in the exclusion bandwidth adjacent to active OFDMA subcarriers.

Software and/or firmware for the new system and method of leakage detection within the upstream bandwidth of the HFC network described hereinabove can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

While an embodiment of the new system and method of leakage detection within the upstream bandwidth of the HFC network has been described by the application, as an exemplary practical implementation for low cost, the present invention is not so limited and other embodiments are also possible. It will be appreciated that variants of the above-disclosed and other features and functions, or alternatives thereof, may be combined into many other different systems or applications, such as, for example, any cable network having an upstream data component where the upstream data from an end user (e.g. from a CM) includes an identifiable preamble or cyclic prefix. Various presently unforeseen or unanticipated alternatives, modifications, variations, or improvements therein may be subsequently made by those skilled in the art which are also intended to be encompassed by the following claims.

What is claimed is:

1. An upstream leak detection system for monitoring leakage in an aeronautical band of a high split HFC by a detection and validation OUDP bursts comprising:
a leak detection apparatus configured for use in a mobile patrol vehicle, said leak detection apparatus comprising:
a processor,
a leakage receiver comprising a burst leak signal detector to measure a duration of detected bursts, said leakage receiver operatively coupled to said processor; and
a leakage data server including a database with physical and IP addresses of cable modems and a core to stimulate an upstream traffic from one or more cable modems in a current vicinity of the mobile patrol vehicle.

2. The upstream leak detection system of claim 1, including a wireless modem operatively coupled to the processor and where the leakage data server resides on a remote server communicatively coupled to the upstream leak detection system by the wireless modem.

3. The upstream leak detection system of 1, including a display operatively coupled to the processor a display to display information associated with the detected bursts.

4. The upstream leak detection system of claim 1, including a global positioning receiver in communication with the processor.

5. A method for leakage detection of an HFC network comprising:
utilizing a patrol vehicle, the patrol vehicle including a global positioning receiver and a signal detector, coupled to a processor;
recording GPS coordinates of a location of the patrol vehicle for correlation to known locations of one or more cable modems;
sending by the one or more cable modems upstream data at a given location of the patrol vehicle;
detecting by the signal detector an impulse signal; and
measuring a duration of the impulse signal to identify the impulse signal as one of a leak burst or a noise impulse.

6. The method of claim 5 further including:
for a verification of each leak burst, detecting a presence of an ATDMA preamble or an OFDMA cyclic prefix.

* * * * *